US012746772B2

(12) United States Patent
Rao

(10) Patent No.: US 12,746,772 B2
(45) Date of Patent: Sep. 29, 2026

(54) METHOD FOR ITERATIVE INKJET PRINTING ON CURVED SURFACES

(71) Applicant: TubeWriter LLC, Austin, TX (US)

(72) Inventor: Nagasatish Rao, Austin, TX (US)

(73) Assignee: TubeWriter, LLC, Austin, TX (US)

( * ) Notice: Subject to any disclaimer, the term of this patent is extended or adjusted under 35 U.S.C. 154(b) by 53 days.

(21) Appl. No.: 18/444,728

(22) Filed: Feb. 18, 2024

(65) Prior Publication Data

US 2024/0343053 A1 Oct. 17, 2024

Related U.S. Application Data

(60) Provisional application No. 63/448,015, filed on Feb. 24, 2023.

(51) Int. Cl.

| | |
|---|---|
| ***B41M 1/40*** | (2006.01) |
| ***B41J 2/21*** | (2006.01) |
| ***B41J 11/00*** | (2006.01) |
| ***B41M 5/00*** | (2006.01) |

(52) U.S. Cl.

CPC .......... *B41M 5/0088* (2013.01); *B41J 2/2114* (2013.01); *B41J 11/00214* (2021.01)

(58) Field of Classification Search

CPC .. B41J 2/2114; B41J 3/40733; B41J 3/40731; B41M 5/0011; B41M 5/0017; B41M 5/0088; B41M 1/40

See application file for complete search history.

(56) References Cited

U.S. PATENT DOCUMENTS

2019/0315129 A1* 10/2019 McConville ......... B41M 5/0064
2021/0055709 A1* 2/2021 Rao ........................ B41J 11/002

FOREIGN PATENT DOCUMENTS

CN 114559745 B * 9/2023 ................ B41J 2/04
KR 20230143409 A * 10/2023 ............ B41J 3/4073

OTHER PUBLICATIONS

Jung, Machine TranslationofKR-20230143409-A, 2023 (Year: 2023).*
Xie, Machine TranslationofCN-114559745-B, 2023 (Year: 2023).*

* cited by examiner

*Primary Examiner* — Scott A Richmond
(74) *Attorney, Agent, or Firm* — Michael B. Indrajana

(57) ABSTRACT

A method to improve the printing quality of an inkjet printing device for cylindrical surfaces. Specifically, the method will improve the quality of the printed images on the surface of cylindrical objects by iteratively printing and curing the images multiple times, such that even if the outermost layer of ink pigments somehow become smeared and/or removed due to external exposure, the remaining ink pigments below will preserve the printed image's fidelity and legibility.

6 Claims, 29 Drawing Sheets

METHOD FOR ITERATIVE INKJET PRINTING ON CURVED SURFACES

CROSS REFERENCE TO RELATED APPLICATIONS

This Non-Provisional Patent Application claims the benefit of priority of U.S. Provisional Patent Application No. 63/448,015, filed on Feb. 24, 2023, of which the disclosures are hereby incorporated by reference and to which priority is claimed.

STATEMENT REGARDING FEDERALLY SPONSORED RESEARCH AND DEVELOPMENT

None.

BACKGROUND OF THE INVENTION

Field of Invention

The present invention relates to a method for an inkjet printing device to print on curved, cylindrical surfaces like test tubes, bottles, and other cylindrical objects using UV curable inks and methods thereof.

Description of Related Art

Various methods and systems currently exist to mark the surface of tubes or vials (the terms are interchangeable and any reference herein to one, refers to both) or other objects or articles, with various advantages and disadvantages. Examples of some of such methods will be described herein, but it should be noted that some of these examples are not generally used in the life sciences field.

Manual marking using a marker or pen may be inexpensive, easy to use, and may be done on a variety of types of tube. However, it also may be laborious, may be prone to human error, may be inconsistent, and may not be able to accommodate barcodes effectively. Printing flat adhesive labels on standard computer printers or thermal transfer printers and hand-applying them to objects may be inexpensive, may be easy to use, and may be done on a variety of tubes. However, the process of applying the labels may be laborious and may be inconsistently placed on the object and/or prone to error. Furthermore, labels made of adhesive glue can possibly fall away from a vial when presented with extreme cold or hot environments or when aggressive solvents are applied. Heat shrink tubes may also be laborious to produce and apply. Factory marking may require less labor and may be automation-equipment friendly, however the factory marking option may be more costly and more limited in customizability. Plastic inserts, which may be fitted into separate tubes, may be relatively inexpensive but, in some circumstances, a separate piece of marked plastic must be hand-assembled and may only be available for select tubes, such as cryovials. Direct thermal transfer on the surface of the article may have better solvent resistance, but may be available only for selected articles, such as glass HPLC (chromatography) vials, slides, and histology cassettes whose geometry is directly tied to the method for bringing the thermal ribbon to the object to transfer the thermal ink. Any variation in such geometry from manufacturer to manufacturer can cause issues with the loading mechanism.

Moreover, the rigidity of the object must be within a specific tolerance in order to exert sufficient normal force on the ribbon apparatus. Direct thermal transfer also may be relatively expensive and slow due to the use of ribbons. Automated adhesive label appliers may require relatively little labor and may be applicable to a variety of tubes, however, such equipment may be relatively expensive, tube-specific, slow, and may be prone to jamming when the labeled tube is placed into secondary equipment.

Ink-jet inks are fluids that are ejected by a printhead as tiny drops of ink onto a substrate. Although jetting an ink was first proposed by Lord Kelvin in 1867, the first commercial devices were introduced in the 1950s. For many decades, the most popular ink-jet inks were solvent-based inks. A typical solvent is a volatile substance which reacts with the substrate to improve adhesion, but also evaporates to allow for air drying.

Ultraviolet ("UV") curable inks, on the other hand, do not employ solvents which evaporate. UV inks typically include an acrylic monomer and/or oligomer, pigments, photoinitiators, and other additives. UV inks cure by chemical reaction from the UV light between 200 and 380 nm. A typical UV ink can be cured with less than 1 second of exposure of UV light with sufficient energy (2-8 $W/cm^2$).

There are typically two types of UV curing chemical reactions: free-radical and cationic. In the current state of the art, UV light sources come in two major types, high-intensity mercury arc lamps and UV light emitting diodes (UV-LED). Usually, an ultraviolet light is applied by an ultraviolet light source to an ultraviolet curable ink on a substrate after application of the ink. The ultraviolet light induces a chemical reaction in the ultraviolet curable ink which results in a stronger, cured ink.

UV ink, like most inks, is a pigment dissolved in a carrier. After the ink is ejected onto a substrate, immediately some, but not all, of the solvent evaporates, unlike solvent-based inks where almost all of the solvent evaporates after deposition. A column of very tiny nozzles (100-300 nozzles), each with a droplet of ink is connected to an electronic device. The device can command any particular nozzles to heat up. In the process of heating up, the ink droplet that is near the nozzle's opening will be ejected from the printhead. The substrate is typically strafed across the column of nozzles. As the substrate moves, different sets of nozzles are fired very rapidly (as fast as ten thousand times a second). The combination of selective firing and the movement of the substrate produces a printed image on the substrate.

After the application of the ink to the substrate, it is typically moved under the UV light source. The UV light cures the remaining solvent/pigment ink mixture and sets it into a particular location. That location is the specified text or images specified by the nozzle firing sequence. But before curing, the solvent-pigment mixture can migrate slightly on the substrate. Such migration distorts the accuracy and resolution of the printed image.

The speed with which solvent evaporates before UV curing is correlated to the temperature of the substrate. If the substrate is heated sufficiently, then the heat is transferred to the solvent-pigment which induces more of the solvent to evaporate. If enough solvent has evaporated, the pigment does not have enough of the solvent carrier to migrate far, resulting in a higher quality print result.

Against this backdrop, even with all of the considerations above, due to the very nature of the curved, non-porous substrate printing surface and the properties of the UV curable inks, creating a high-fidelity print on certain lines, shapes, and objects can still be challenging, and the typical print output of a single pass of the print may be significantly improved by repetitive and/or iterative printing on certain portions of said lines, shapes, and objects. The invention takes the advantage of the fact that by identifying certain portions of lines, shapes, and objects for additional iterative printing passes and running additional iterative printing passes on such identified lines, shapes and/or objects, the quality of the printout may be improved.

SUMMARY OF INVENTION

A method for improving printing quality of a printing apparatus for inkjet printing on cylindrical curved surfaces by iteratively printing multiple layers of UV curable ink on a curved surface. In one possible embodiment, the method is used in the context of a device that is an inkjet printer, comprising a printing rack that holds a plurality of cylindrical objects like test tubes or pipes, a main unit comprising an Ultraviolet (UV) light source and a printing unit assembly. The printing unit assembly holds an ink cartridge further comprising a plurality of ink nozzles and ink reservoir. In one possible embodiment, the printing rack moves the printing objects relative to the main unit. The printing unit preheats the printing objects prior through the use of the UV light source, and after printing the UV light source is used to cure the ink on the surface to produce a high-quality print result.

In a possible embodiment, the inkjet printer has a housing that encloses the main unit, the printing rack, and the printing platform.

The main unit is mounted above the printing platform and printing rack, and the printing rack moves relative to the main unit. In one possible embodiment, the main unit comprises a UV light source and a printing unit.

In one possible embodiment, the UV light source comprises of a plurality of UV LED that can emit UV light that can apply UV radiation to induce a chemical reaction with the ink after printing, but also to apply heat to the print object surface prior to the printing process.

The printing unit comprises of an inkjet cartridge mounting assembly. The inkjet cartridge comprises an ink reservoir and a plurality of nozzles mounted at the bottom portion of the cartridge and dispenses ink through the nozzles during the printing process.

In a possible embodiment, the inkjet printer has a printing platform that can hold a removable printing rack capable of holding a plurality of print objects. The printing rack is designed to hold a plurality of cylindrically shaped print objects organized by rows and columns. For example, if the print object is a small test tube, then the print rack can hold up to several dozens of test tubes at a time. The printing rack can also have numerical labels to help pinpoint the target print object during the printing process.

In a possible embodiment, the printing platform comprises a platform mounted on a pair of rails that can travel laterally and perpendicularly relative to the print unit. In another possible embodiment, the printing platform is a circular track, with the printing rack in the shape of a circular plate, and the printable tubes are placed along the circumference of the circular plate.

In a possible embodiment, the printing device is then typically connected to a computer that can handle print commands and functions through a standard office and/or printing application suite like Microsoft Word, Excel, Acrobat, and the like, or through a customized software.

To print, a user will typically load a number of the printing objects into the removable printing rack and mount the printing rack into the printing platform. The user then inputs the print parameter and command through a computer. Once the user executes the print command, the printing process begins.

In one possible embodiment, the printing process begins by preheating the target print object under the UV-LED unit to heat the surface for several seconds at most. Once the target print object has been heated sufficiently, the target print object is moved underneath the printing unit so the printing unit can dispense ink through the nozzles onto to the surface based on a pattern, text, or image predefined in the printing software. Once the print process completes, the target print object is moved under the UV-LED unit again to cure the ink. The process then repeats itself again for the next target print object until all the target print objects on the rack has been printed. Once the print job is complete, the printing platform returns to the initial position so the user can retrieve the removable rack with the completed printed objects.

In one possible iterative print implementation, after the first print cycle is completed, the software scans the printed image or text and maps each dot it scanned in a 3×3 rectangular array with the scanned dot being in the middle of said rectangular array, and calculates the number of adjacent dots and assigns a score for that dot ranging between zero to eight based on the number of adjacent dots present. The software then makes a copy of the original image, and modifying said copy by removing dots that have a score higher than some desired level. The new image is then sent to the printer, and another print cycle is performed to iteratively print on the surfaces based on the new information and create a higher quality output. This process can be repeated automatically until the desired effect is achieved.

In one possible iterative print implementation, after the first print cycle is completed, a layer of a pigment-free UV ink formulation is printed on top of the image and subsequently cured, thus creating a clear-coat layer that further protects the printed image from smearing, which could happen when the objects are being handled and/or sanitized using chemicals that could potentially react chemically with the ink pigments on the printed image.

BRIEF DESCRIPTION OF DRAWINGS

The disclosure and the following detailed description of certain embodiments thereof may be understood by reference to the following figures.

NUMERAL REFERENCE INDEX

100—Curved surface printing device
200—Enclosure
210—Handle
220—Print Unit Opening
300—Base Unit
310—Emergency Button
320—LED
330—Safety Sensor
340—Printing Unit Mount
400—Printing unit
410—UV Light Source
411—Data Cable Ports
412—UV LED unit.
420—Ink Dispensing Unit
421—Data Cable Ports
422—Ink Cartridge Holder
423—Ink Cartridge Tab
430—Ink Cartridge
431—Ink Nozzles
440—Printing Unit Post
450—Data Cables
510—X-Axis Rail
520—Y-Axis Rail
530—Printing Rack Platform
600—Printing Rack
620—Cylindrical Object
701—An example letter "A" printed on a curved surface
702—Ink
703—Foreign solvent molecules
704—An example letter "A" printed on a curved surface after iteratively printed
705—Second layer of ink
706—Third layer of ink
707—Fourth layer of ink
708—Clear UV-ink coat
800—Scanned Image Copy
801—A surrounded ink
802—A partially surrounded ink
901—Printed Cylindrical Object

DETAILED DESCRIPTION OF THE PREFERRED EMBODIMENT(S)

Figure 1A:
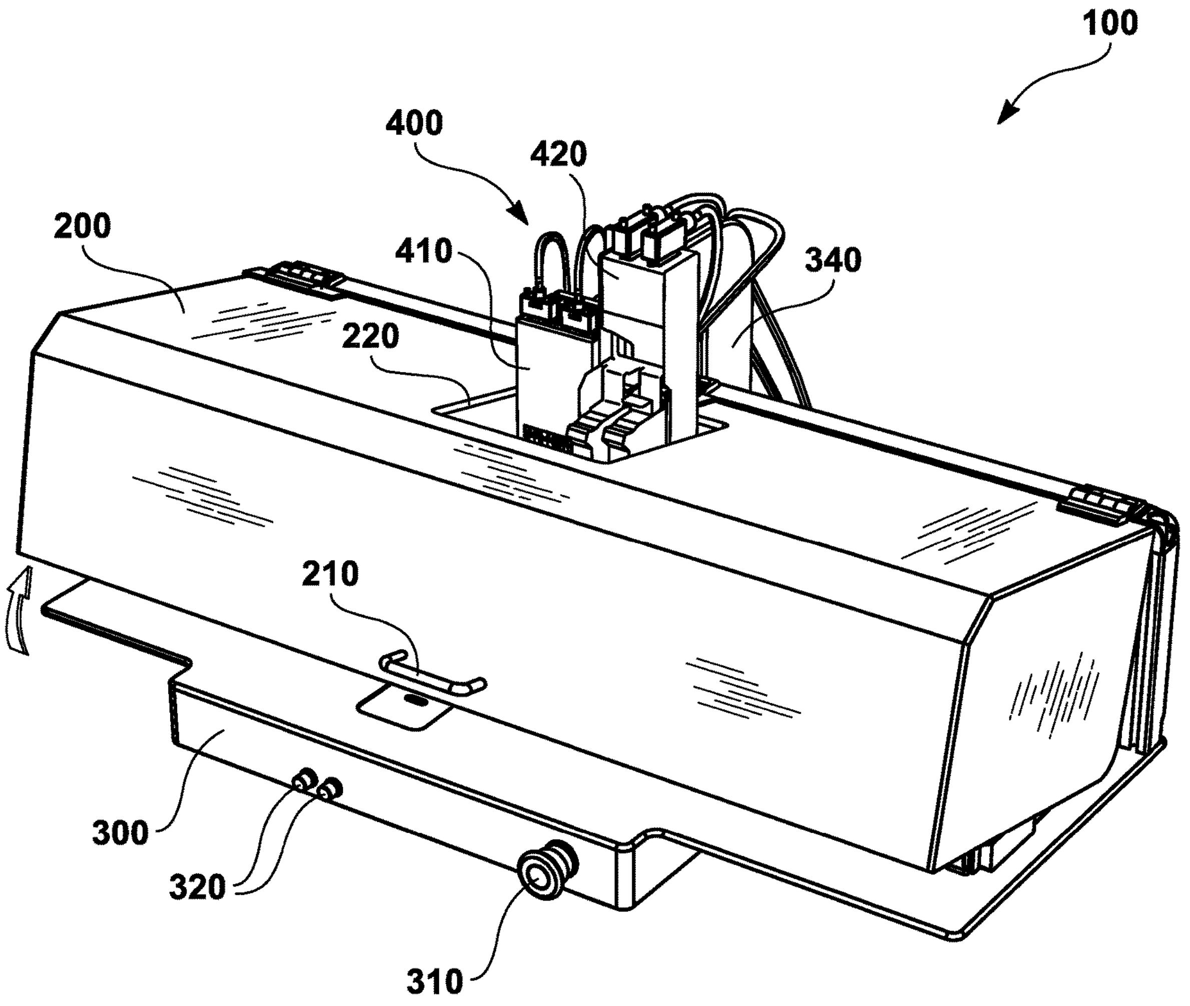
FIG. 1A depicts a front perspective view of a possible embodiment of a curved surface printing device, with FIG. 1B depicting a rear perspective view of a possible embodiment of a curved surface printing device.
Figure 1B:
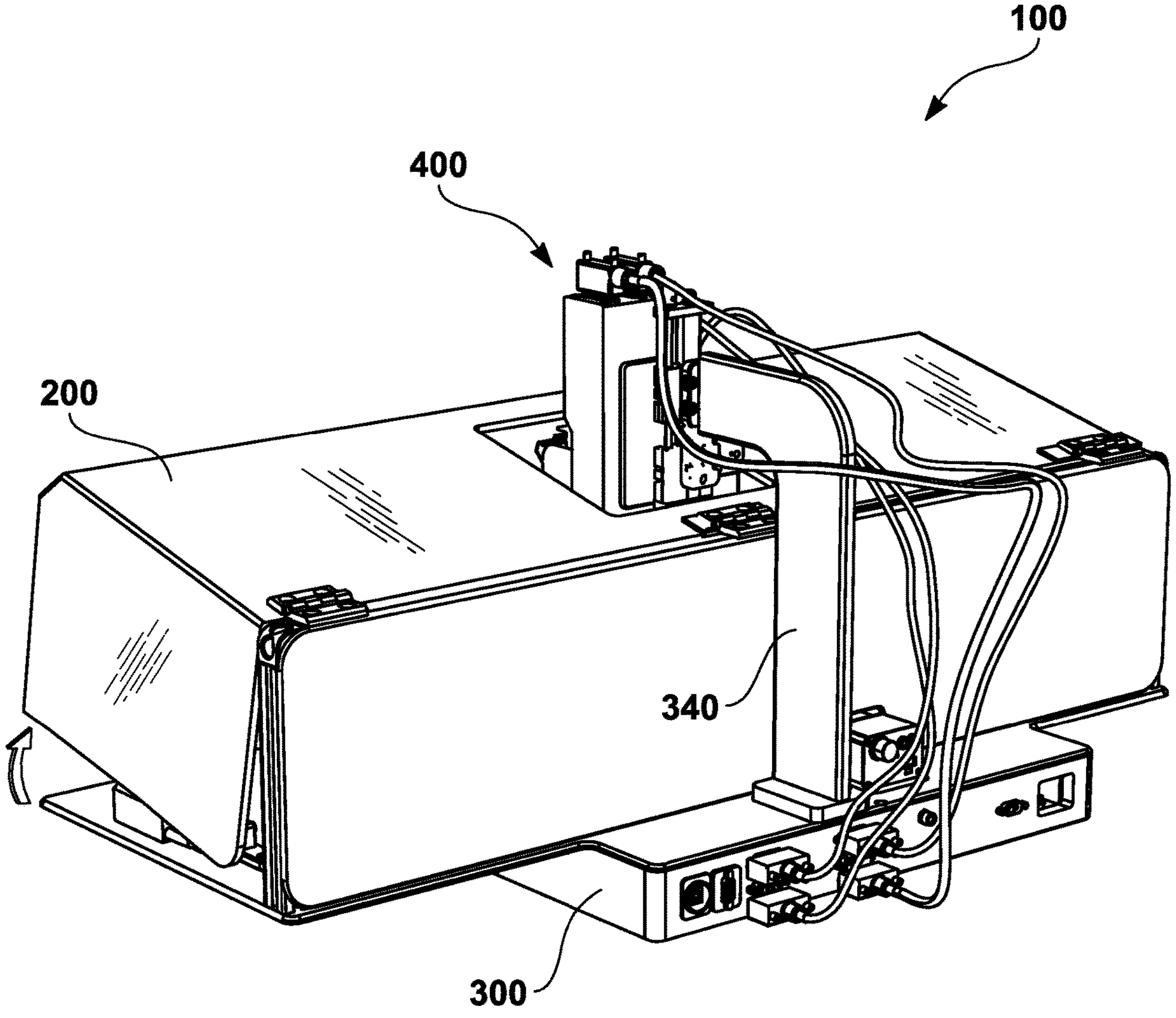
Figure 2A:
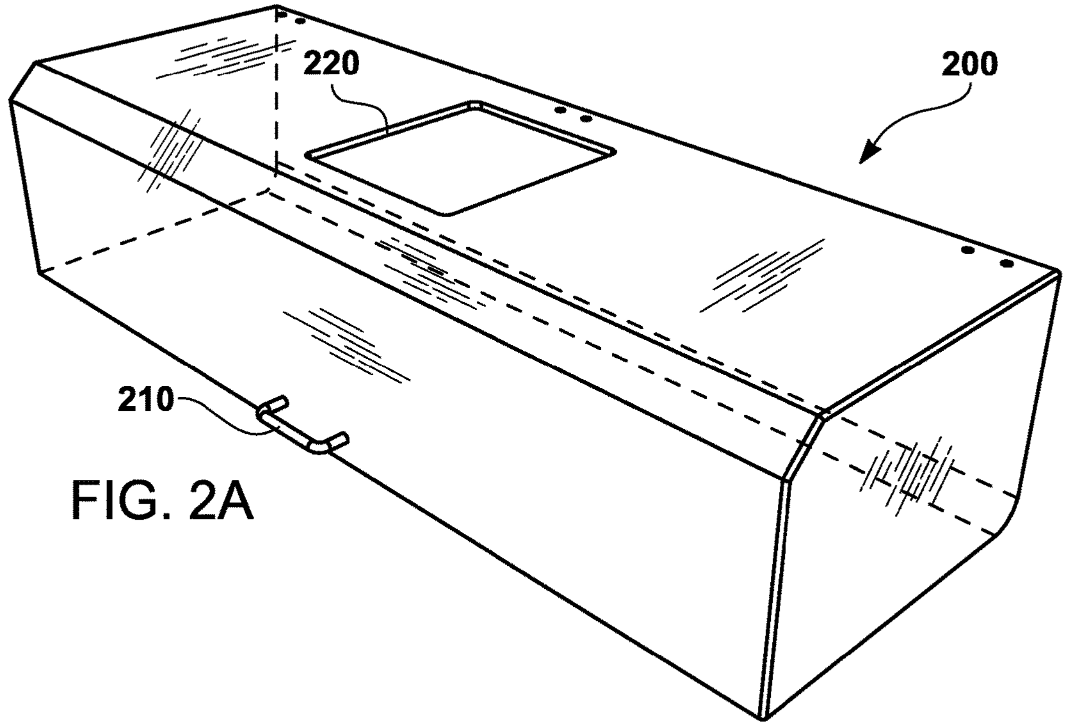
FIG. 2A depicts an exploded view of a curved surface printing device, with FIG. 2B depicting the internal view of the curved surface printing device.
Figure 14A:
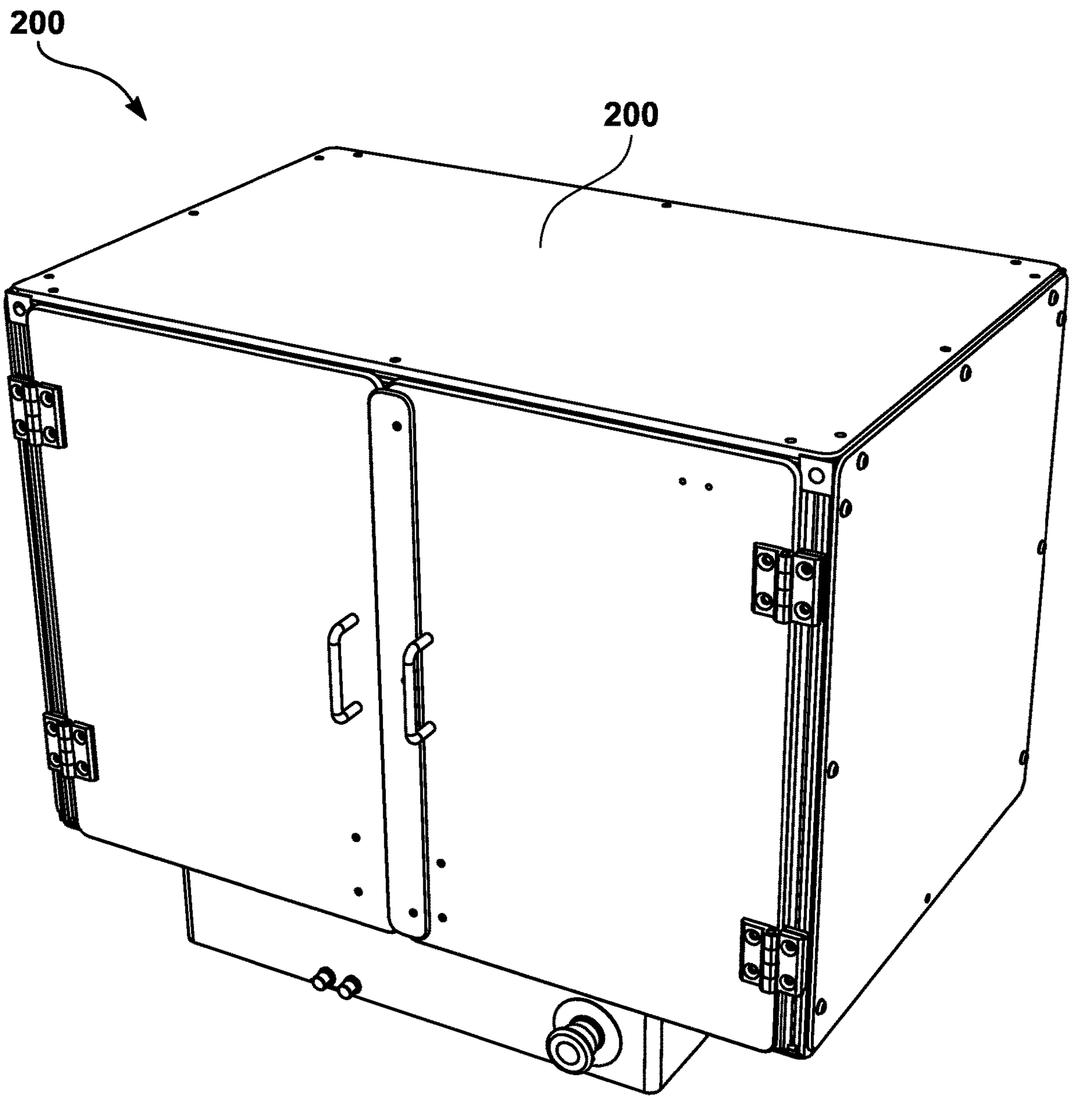
FIGS. 14A and 14B depict an alternate embodiment of the curved surface printing device.
Figure 14B:
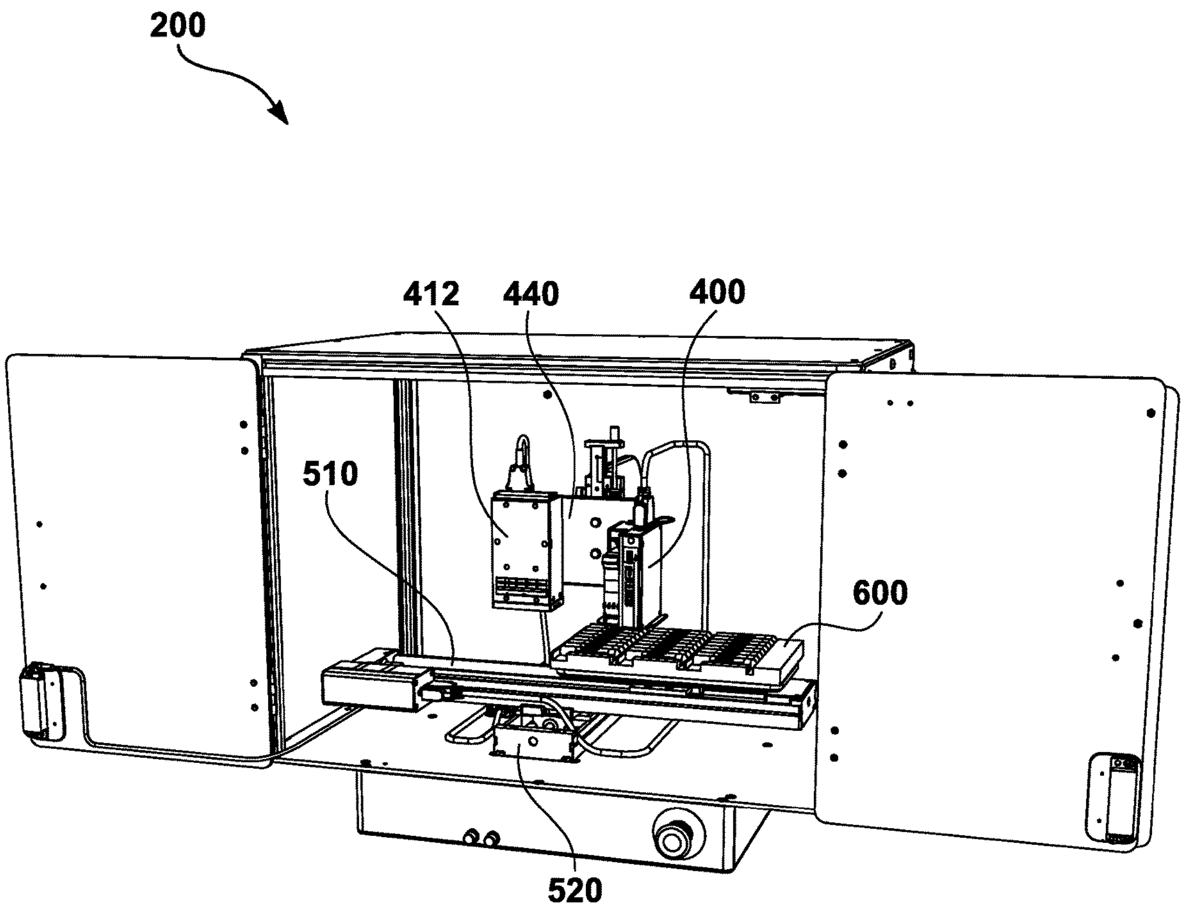
Figure 16:
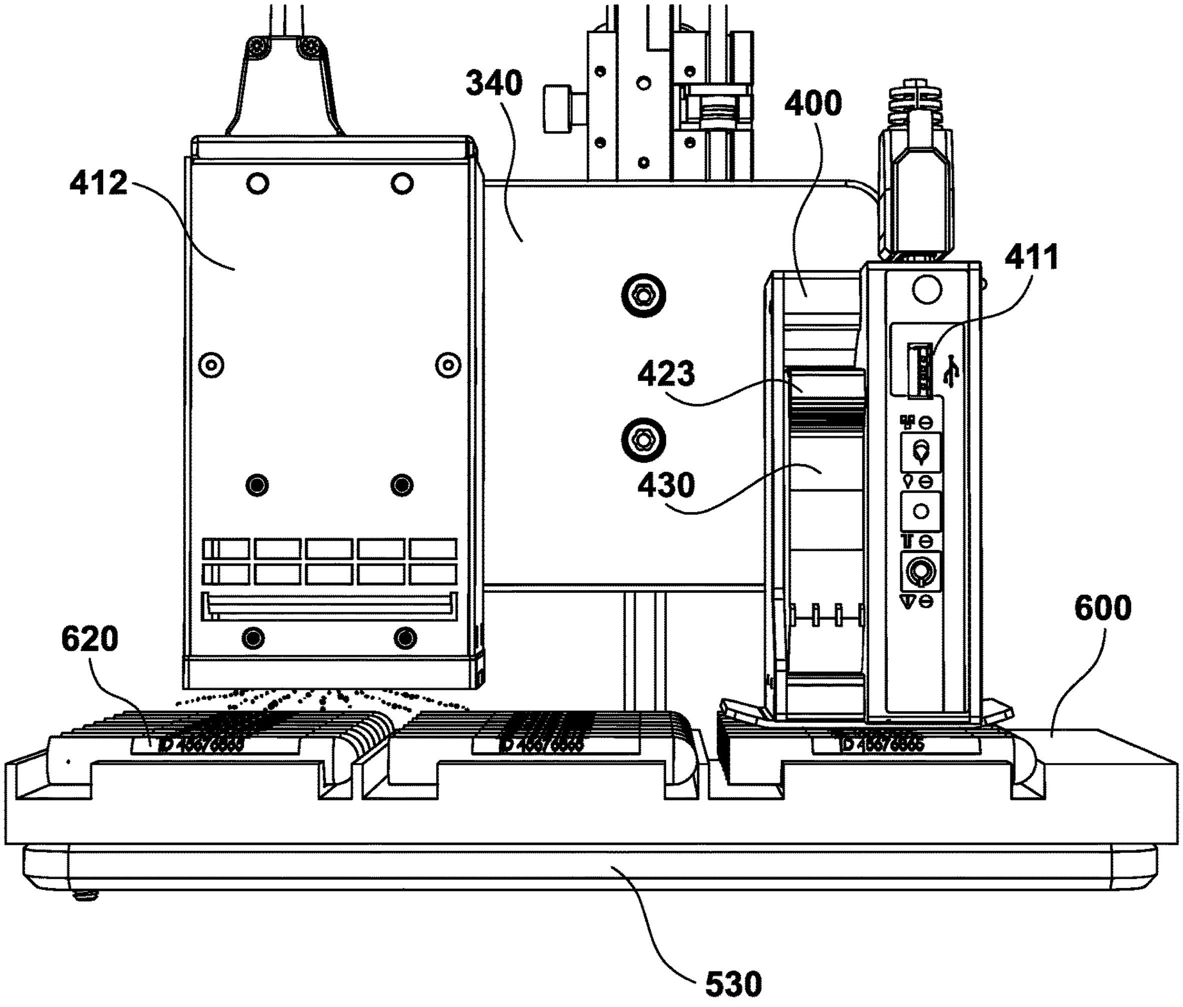
FIG. 16 shows a front view of the alternate embodiment of the curved surface printing device.

Referring to FIG. 1, a possible embodiment of a curved surface printing device 100 is illustrated here. Referring to FIG. 2A, the enclosure 200 has a handle 210 to lift open and close the enclosure during printing operations. An opening 220 is provided to allow room for the enclosure 200 to move around the printing unit 400 during opening and closing. Referring to FIGS. 14A and 14B, the enclosure can also be configured in a barn-door configuration, where a pair of doors can open from the front of the device like conventional doors rather than the lift-up door configuration. Alternatively, FIGS. 14A, 14B, and 16 show an alternative configuration of the printing enclosure, where the doors conventionally open from the front rather than horizontally hinged, depending on the need and/or space available for the machine.

Figure 2B:
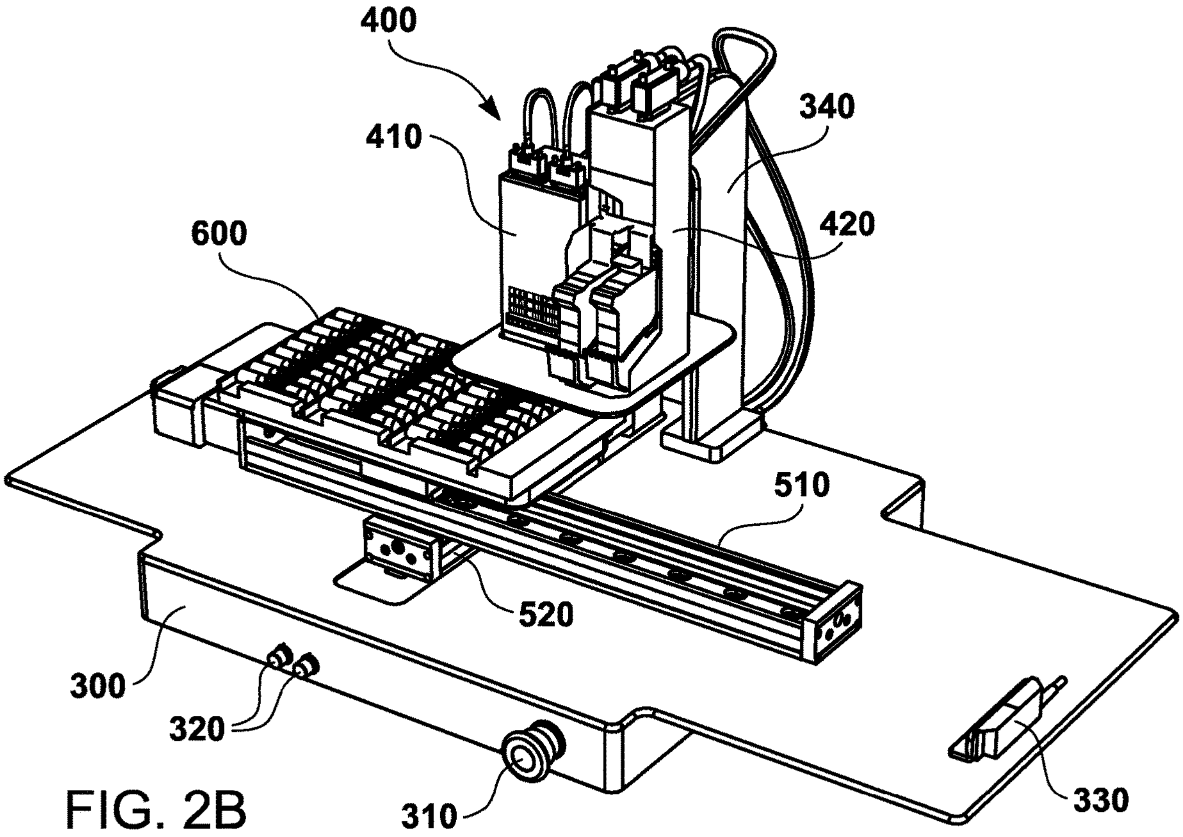

Referring to FIG. 2B, the base of the curved surface printing device 300 has an emergency stop button 310 and LED lights 320 to display the status of the machine. A safety sensor 330 can also be provided to ensure that the enclosure is closed before the printing process begins. The printing unit 400 is mounted to the base 300 using the printing unit mount 340, safely securing the printing unit above the printing rack 600 mounted on the x-axis printing rail 510 and the y-axis printing rail 520. The printing unit 400 has the UV light source unit 410 and the ink dispensing unit 420.

Figure 3:
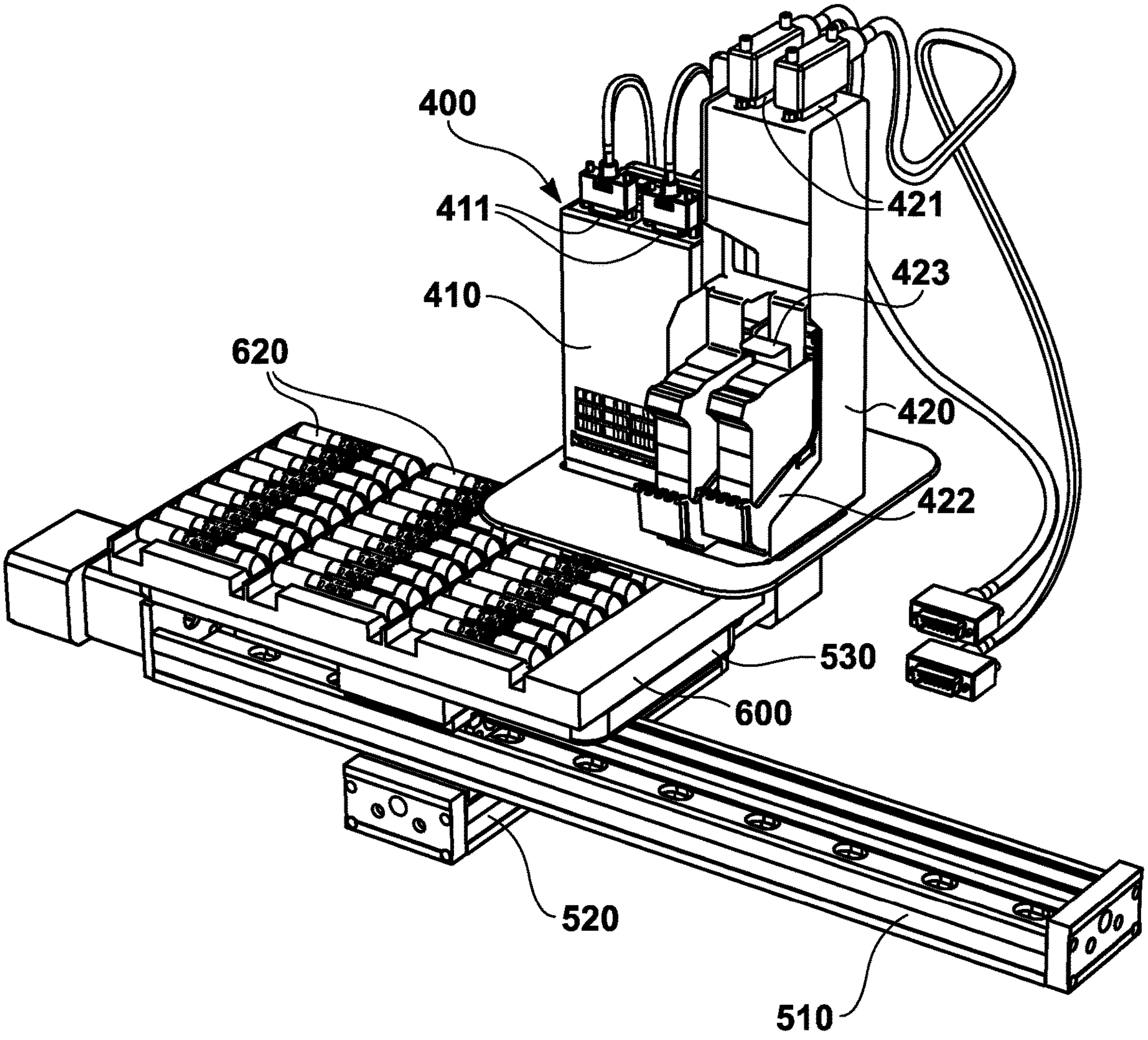
FIG. 3 depicts the moving platform and the printing unit of a curved surface printing device.

Referring to FIG. 3, an exploded view of the printing unit 420, the printing rack platform rail 530 supported by the x-axis rail 510 and γ-axis rail 520, and the printing rack mounted to the platform rail 530 is provided for better understanding of the mechanism in one possible embodiment.

Figure 4A:
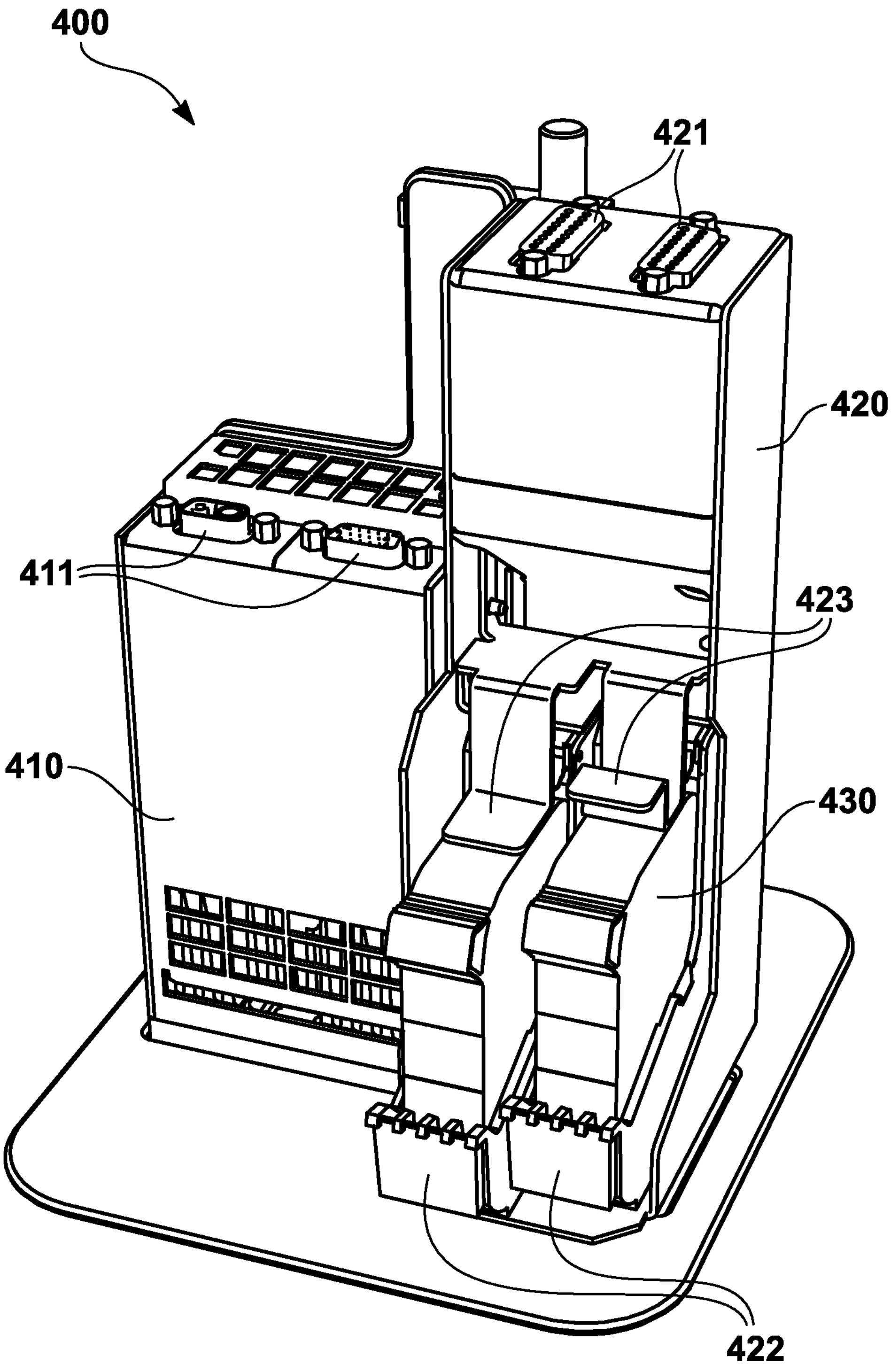
FIG. 4A depicts the printing unit on a curved surface printing device.
Figure 4B:
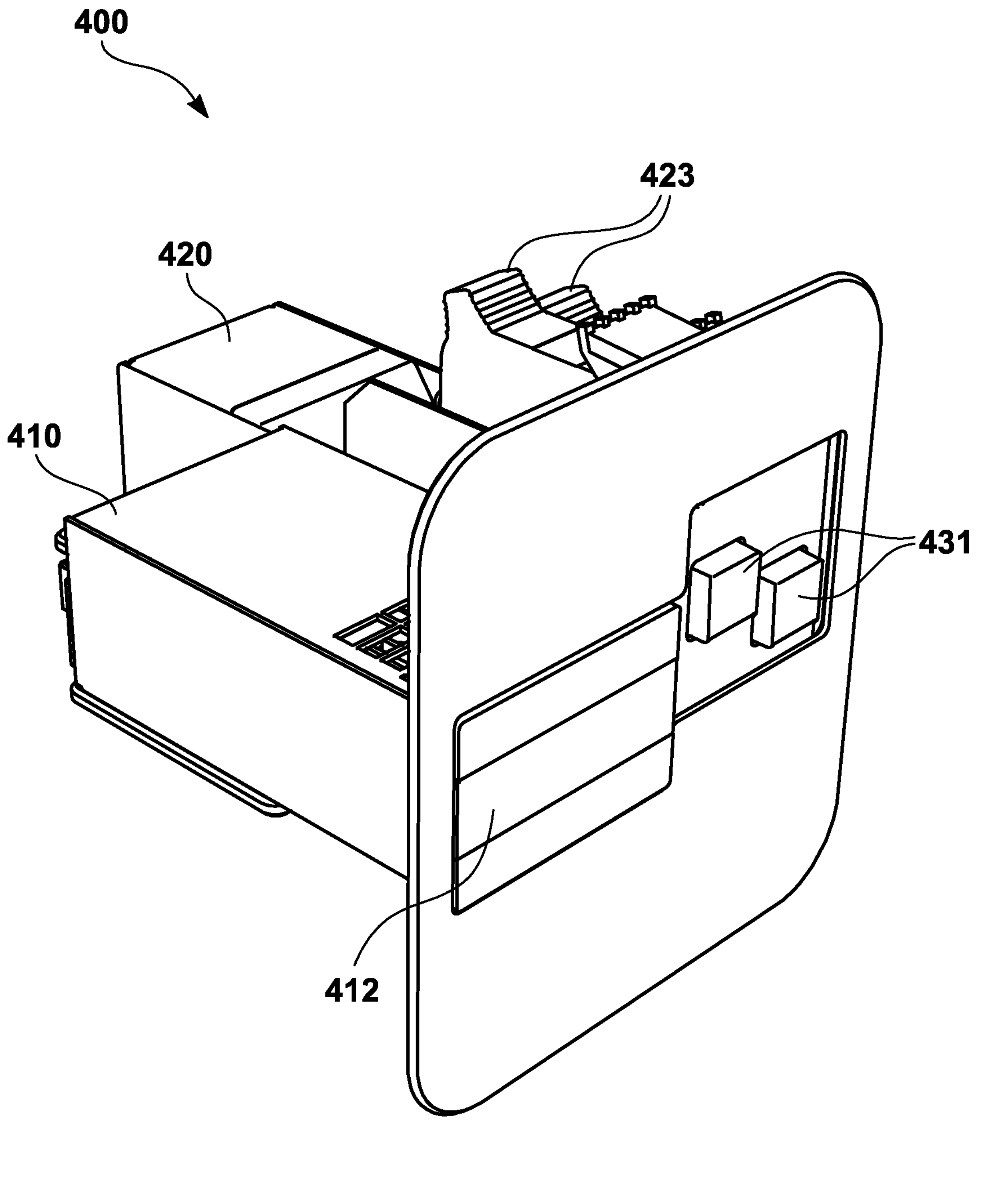
FIG. 4B depicts the bottom portion of printing unit on a curved surface printing device.

Referring to FIG. 4A, the printing unit 400 has the UV light source unit 410 and the ink dispensing unit 420. Referring to FIG. 4B, in which the bottom view of the printing unit is displayed, the UV light unit 412 and ink nozzles 431 are mounted on top of the printing rack, providing UV light and ink from above as the printing rack travels underneath the printing unit.

Figure 5:
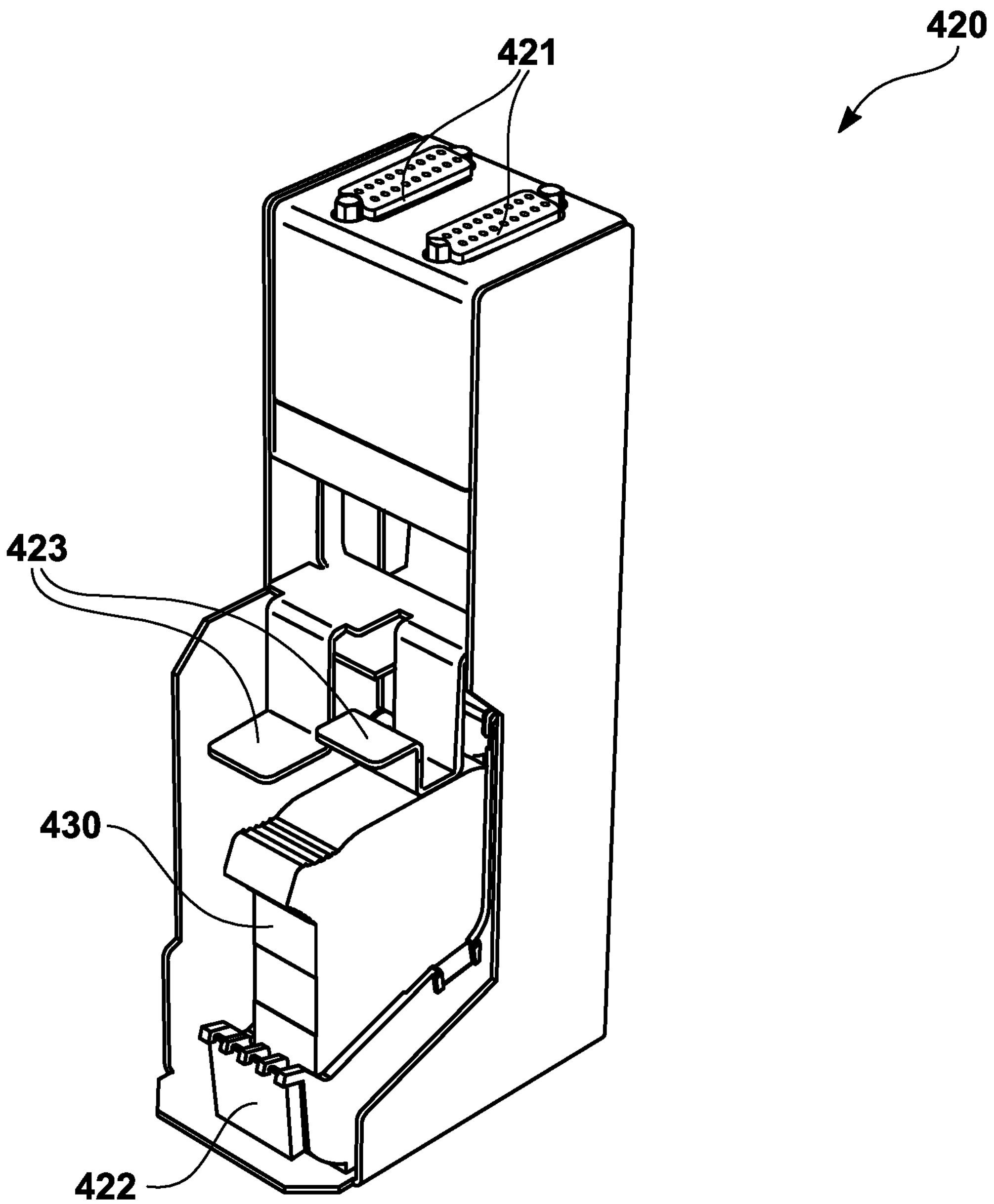
FIG. 5 depicts the ink dispensing unit on the printing unit on a curved surface printing device.

Referring to FIG. 5, The ink dispensing unit 420 has a plurality of data cable ports 421 and a plurality of ink cartridge holders 422. The ink cartridge 430 is mounted on the ink cartridge holder 422, and the ink cartridge tab 423 can be pushed down to dismount the ink cartridge 430 from the ink cartridge holder 422 to replace the ink cartridge. The ink cartridge 430 has a plurality of ink nozzles 431 built into the ink cartridge, so the maintenance of the ink nozzles can be performed by simply replacing the ink cartridge with new ink nozzles that are integrated to the removable cartridges.

Figure 6A:
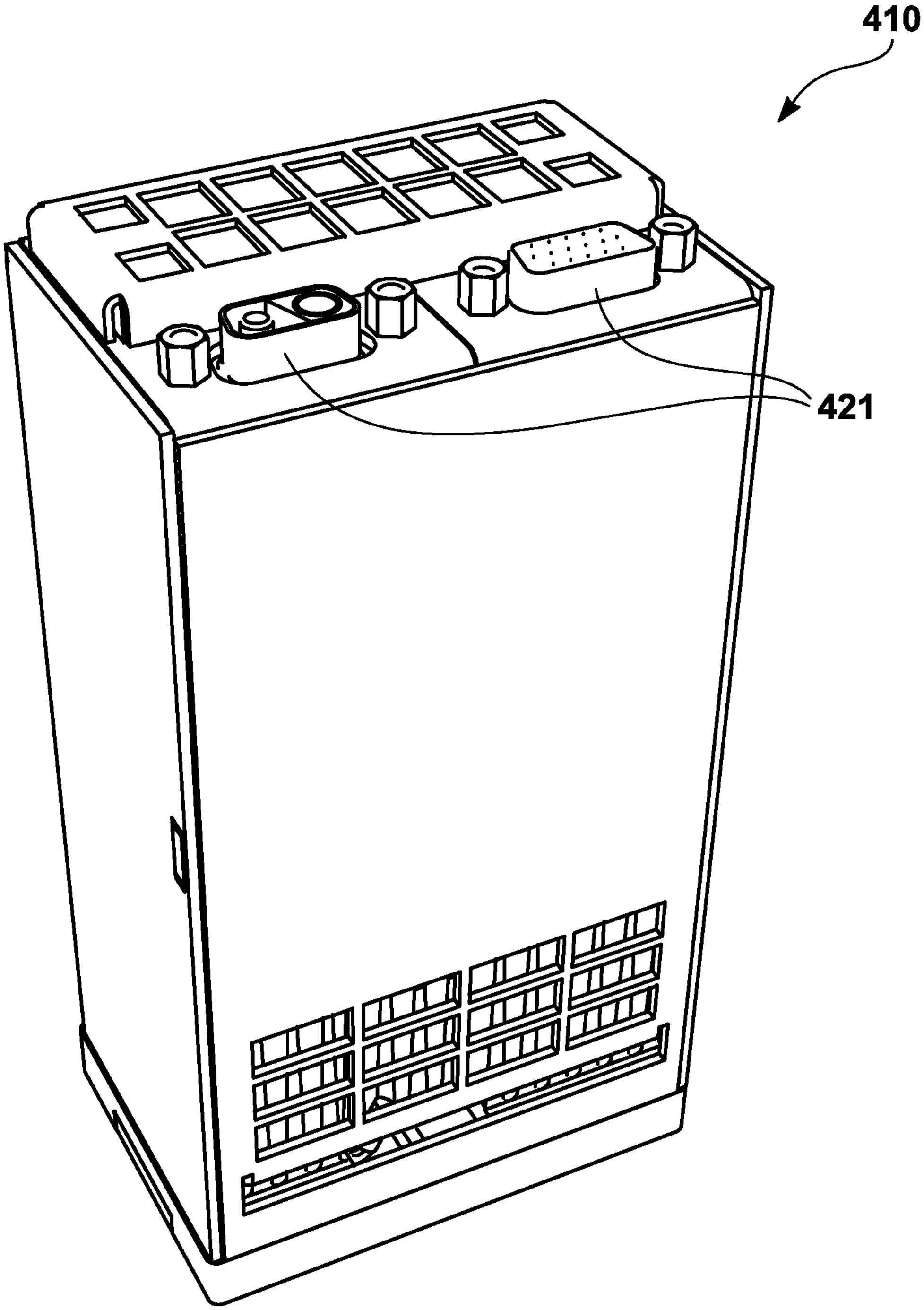
FIG. 6A depicts the UV light source unit on the printing unit on a curved surface printing device.
Figure 6B:
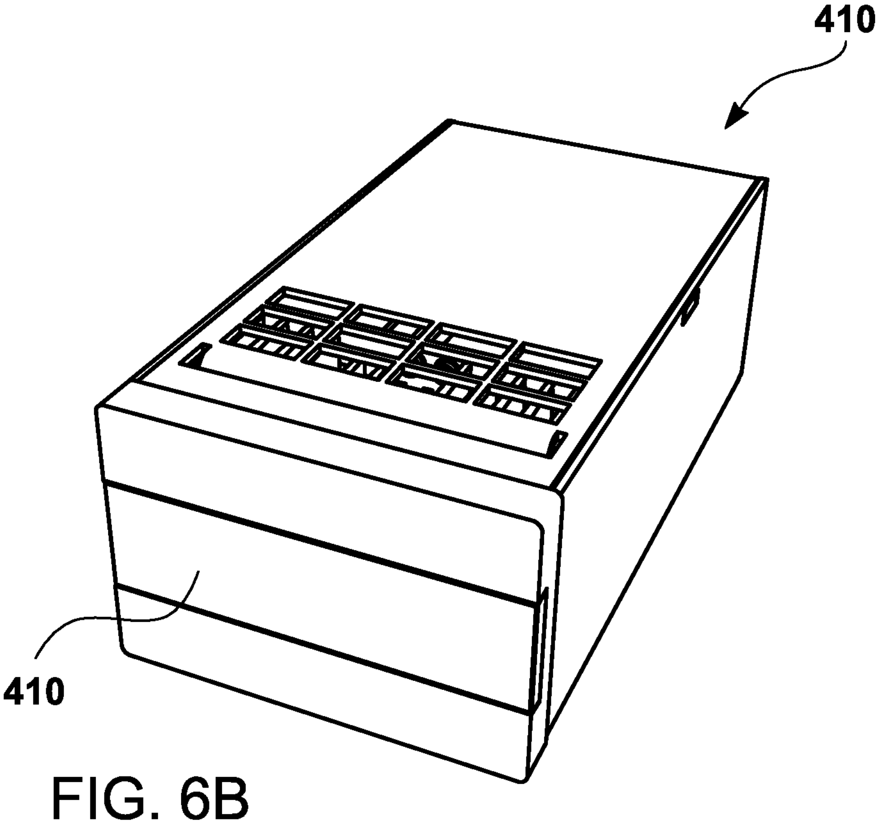
FIGS. 6B and 6C depict alternate views of the UV light source unit on the printing unit on a curved surface printing device.
Figure 6C:
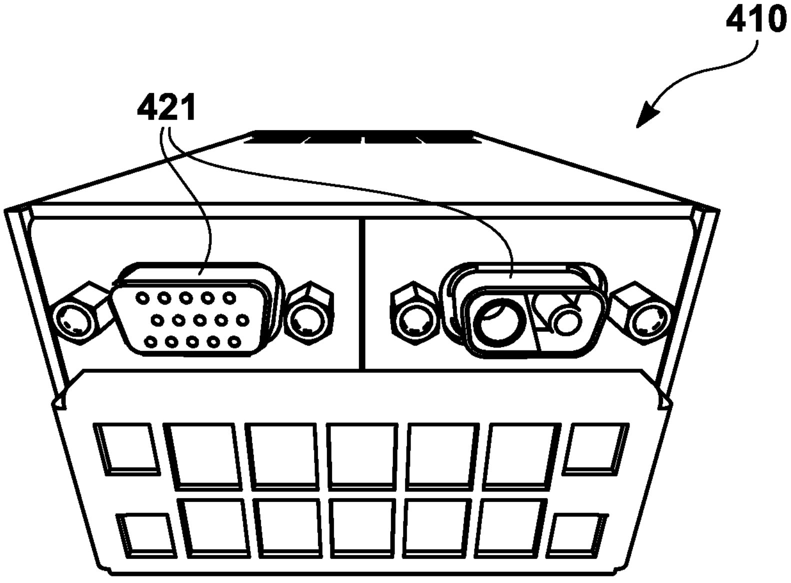

Referring to FIG. 6A, the UV light source unit is a self-contained unit that has several data and power cable connections 421 that allows power and data instructions to be sent/received to the light source unit at the upper portion of the unit as seen in FIG. 6C in greater detail. At the bottom portion of the unit as shown in FIG. 6B, in a possible embodiment, a UV LED-unit facing the printing rack is provided to allow preheating and curing of the cylindrical print objects during the printing process. The UV LED unit can be substituted with other suitable UV light sources including conventional UV light bulbs or hot/cold cathode UV lamps.

Figure 7A:
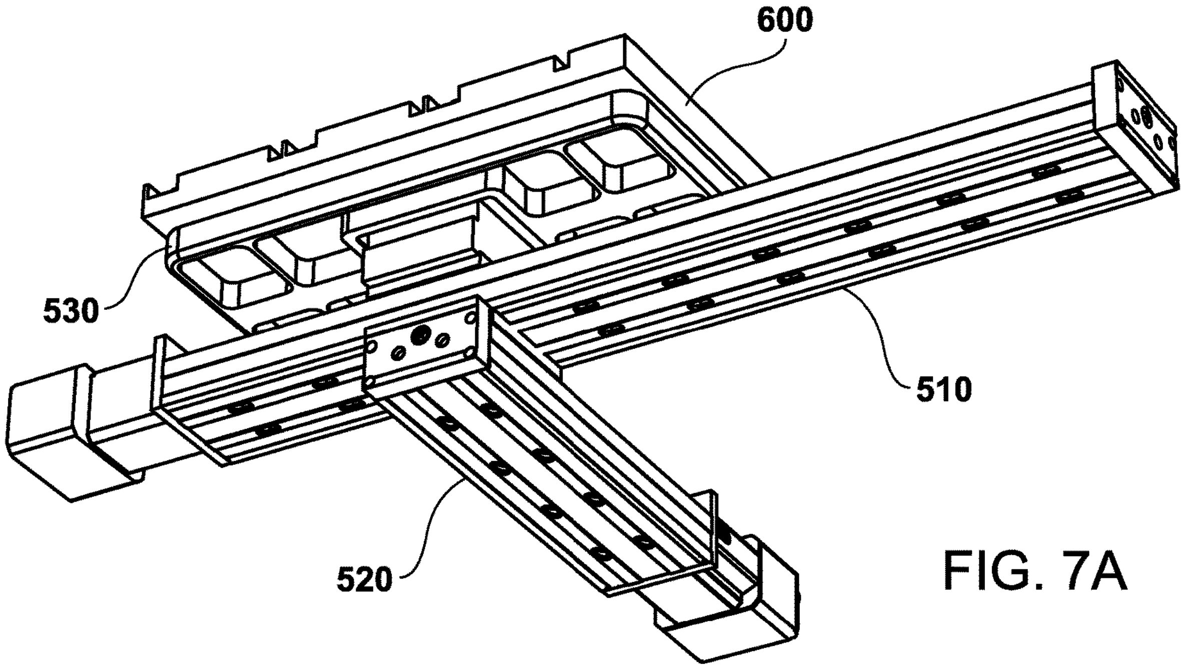
FIGS. 7A and 7B depict the perspective views of the printing platform and rails on a curved surface printing device.
Figure 7B:
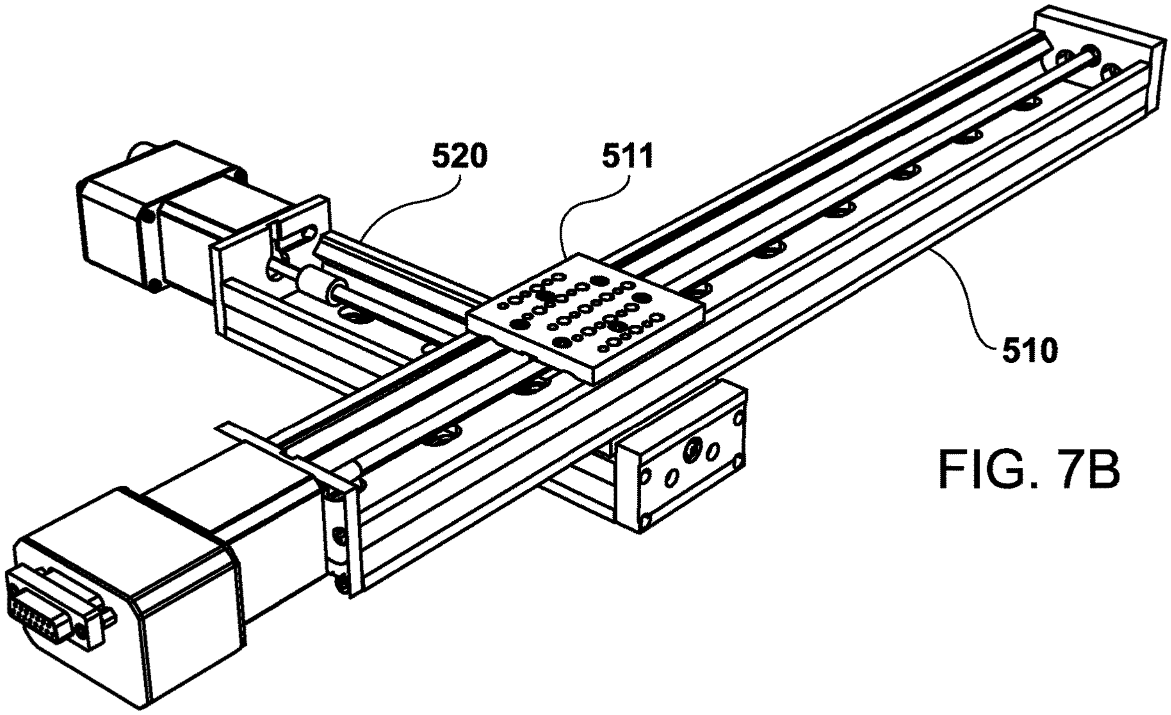
Figure 7C:
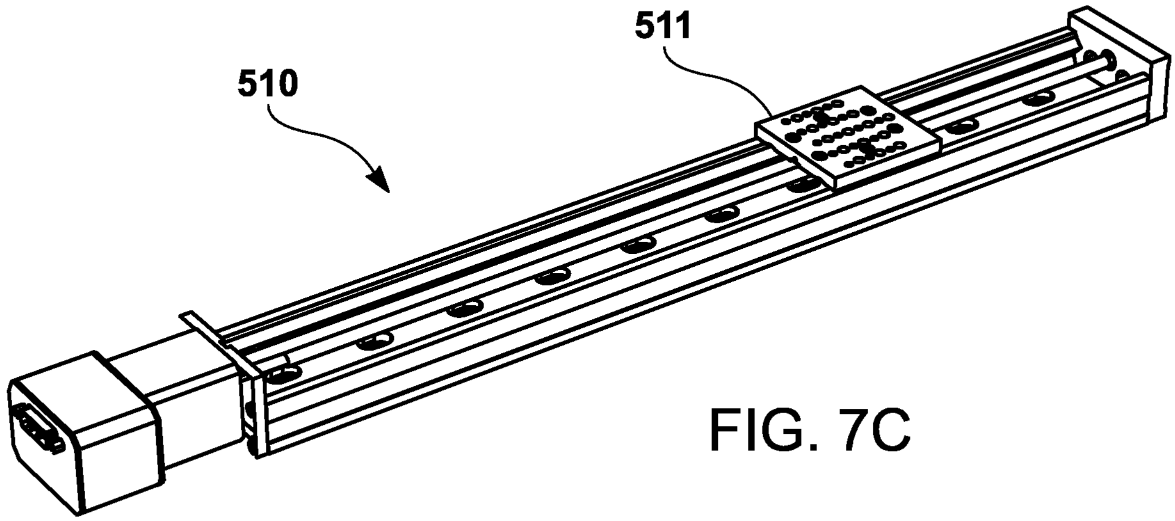
FIGS. 7C and 7D depict the rails on the printing platform on a curved surface printing device.
Figure 7D:
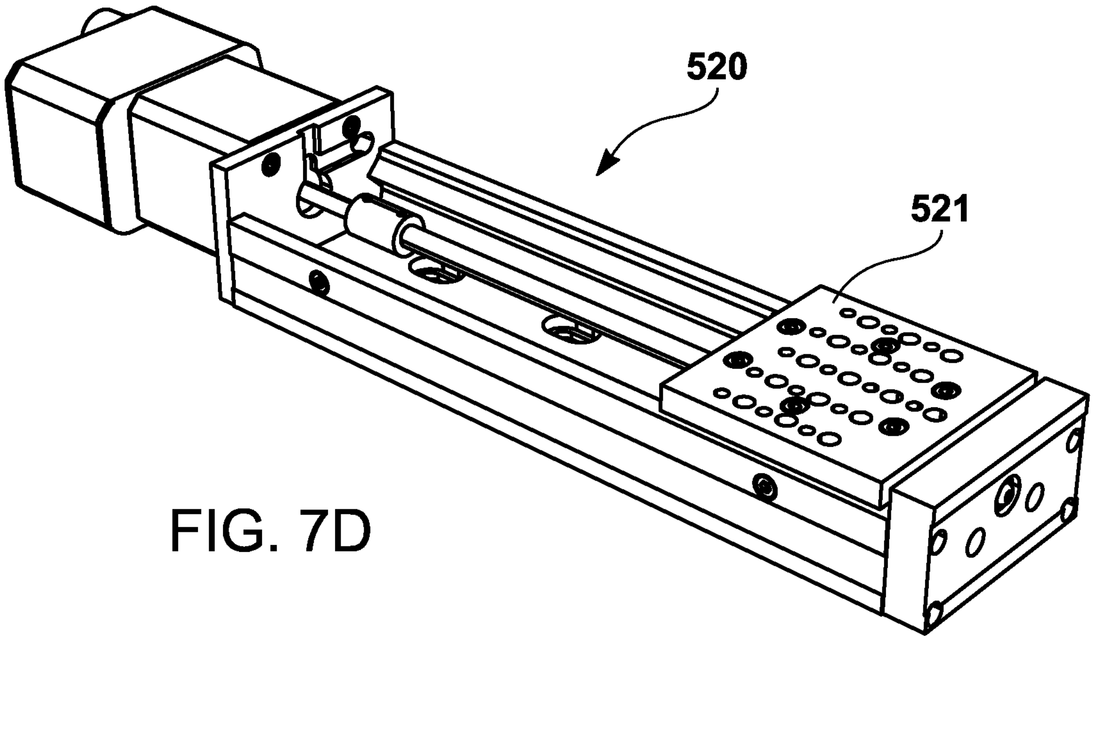

Referring to FIGS. 7A and 7B, in one possible embodiment, the printing rack platform has two perpendicular rails that allow the printing rack 600 to move in a two-dimensional plane relative to the printing unit 400. In one possible embodiment, the x-axis rail 510 allows the printing rack to move laterally on a plane below the printing unit, with the y-axis rail 520 allows the printing rack to move perpendicularly to the x-axis rail on a plane below the printing unit. FIG. 7C depicts the x-axis rail, and FIG. 7D depicts the y-axis rail.

Figure 8A:
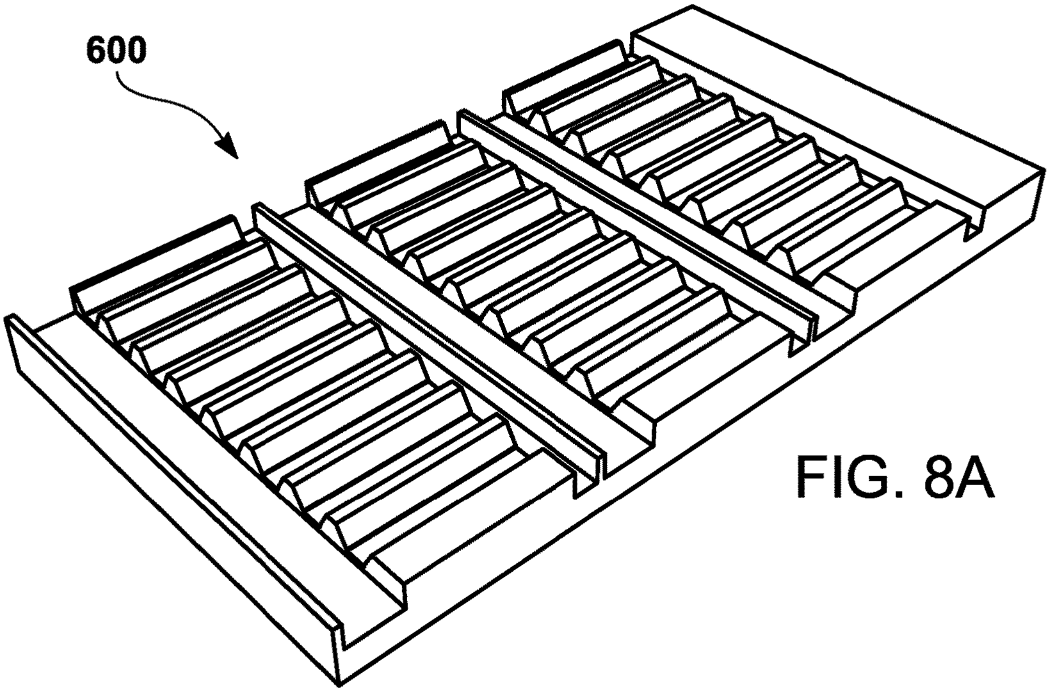
FIGS. 8A and 8B depict the printing racks on a curved surface printing device, with 11A showing one possible version of the rack in an unloaded state, and 11B showing a loaded rack.
Figure 8B:
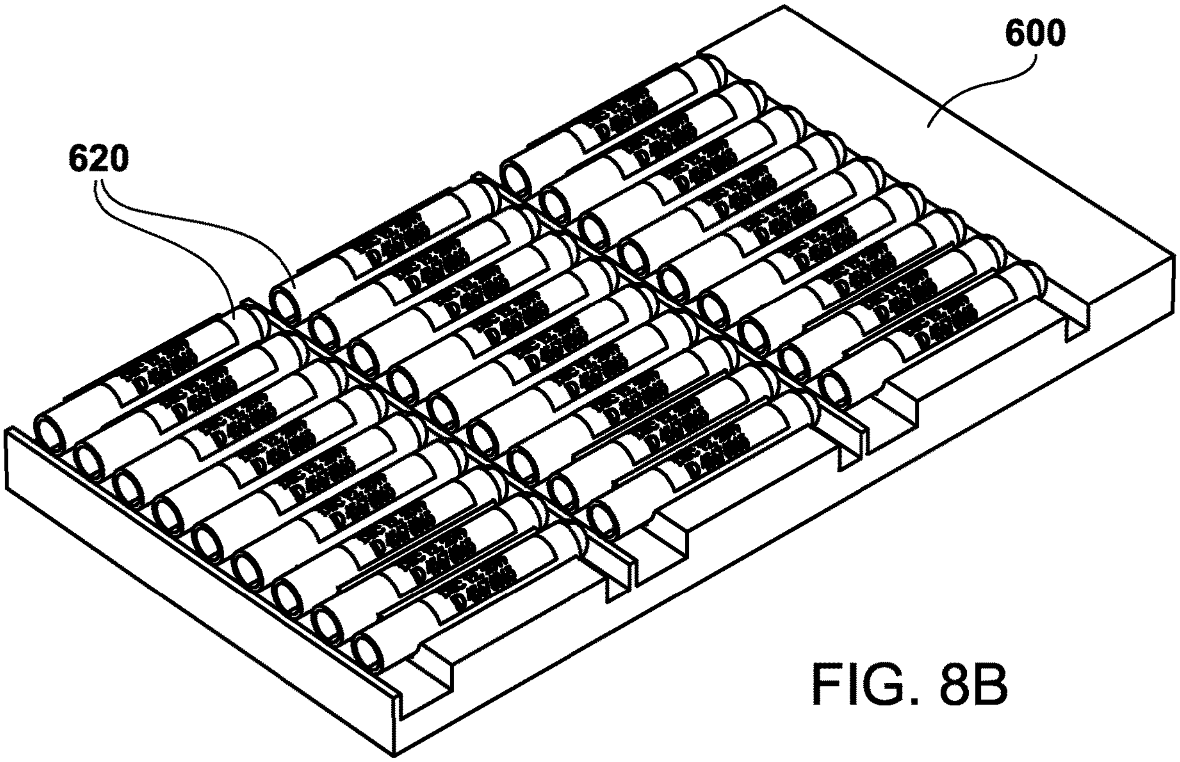

Referring to FIGS. 8A and 8B, the printing rack 600 is used to load and hold the cylindrical objects 620 for the printing process. In one possible embodiment, the printing rack may hold a plurality of small test tubes, medical vials, pipes, or any other cylindrical objects that require printing on their surfaces. The printing rack is mounted to the top portion of the Printing Rack Platform by using a pin or other means of securing the printing rack to the printing rack platform. The rack can be configured in a way that organizes the cylindrical objects into rows and columns that correspond with the printing software such that it is possible for the user to print on a specific row and/or column, or to customize different print functions on each row and column.

Figure 17:
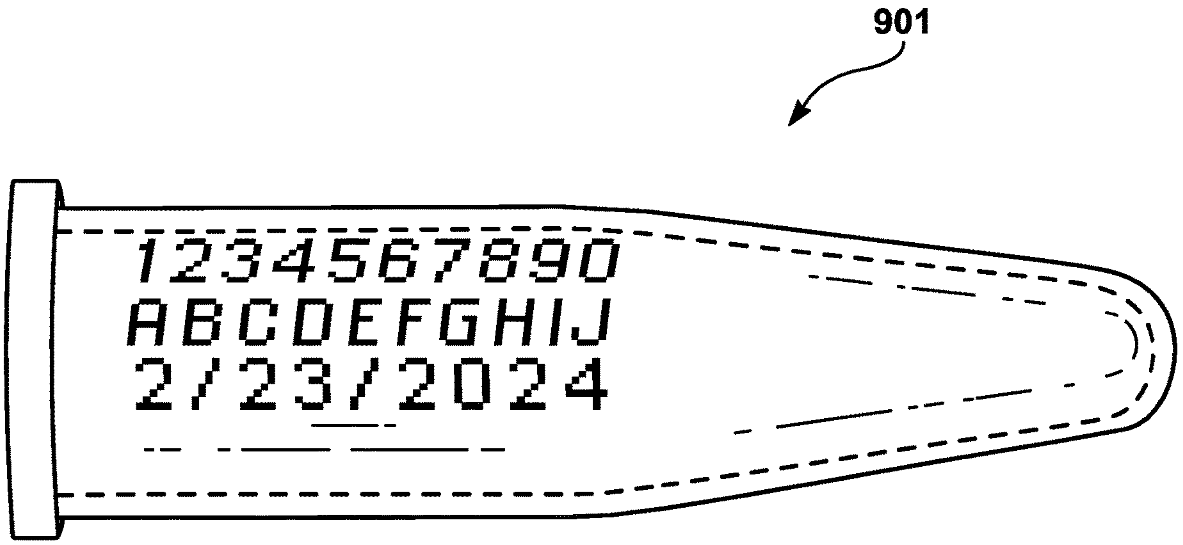
FIG. 17 shows a printed image and/or text on a cylindrical object, i.e., a medical disposable tube.

FIG. 17 shows a close up view of a possible embodiment of the cylindrical object, which can come in the form of a test tube for laboratory use, medical or otherwise. The tube can be made out of glass, plastic, or other materials commonly used for such tubes.

Figure 9A:
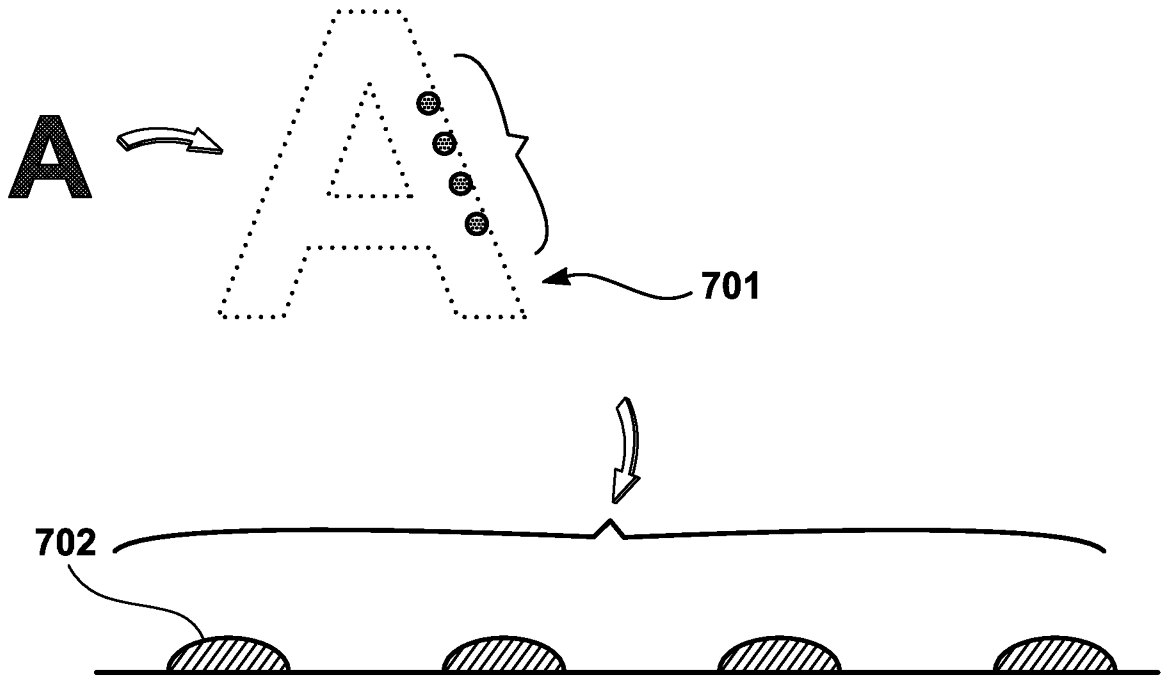
FIGS. 9A, 9B, 10A, 10B, 11A, and 11B depict an idealization of the iterative printing process with different iterations of the print processes.
Figure 9B:
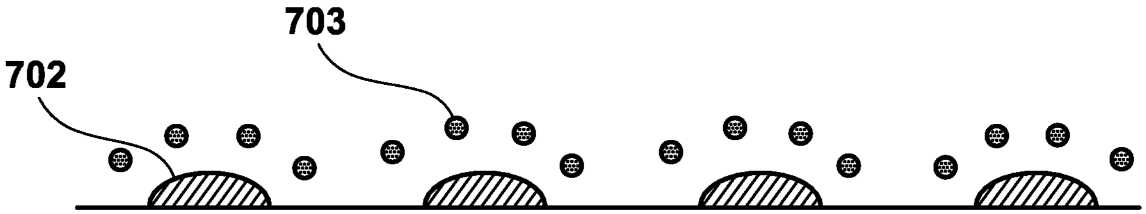
Figure 10A:
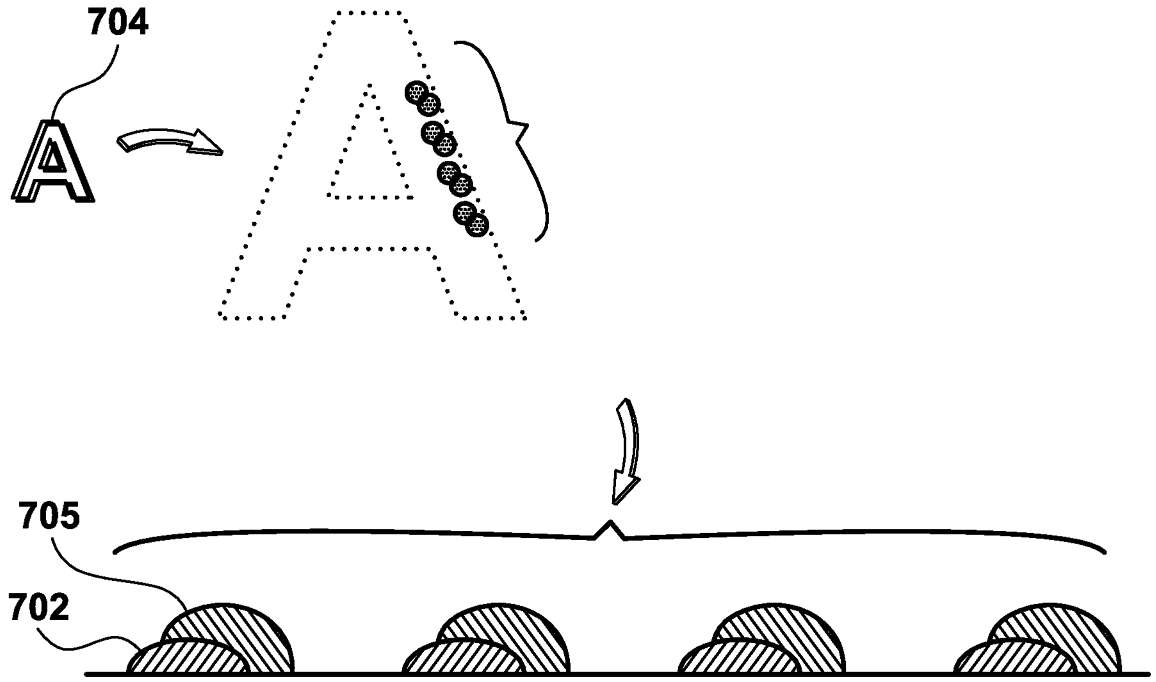
Figure 10B:
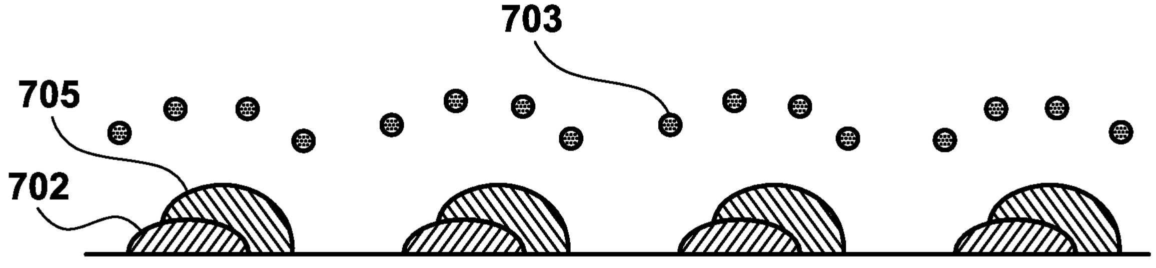
Figure 11A:
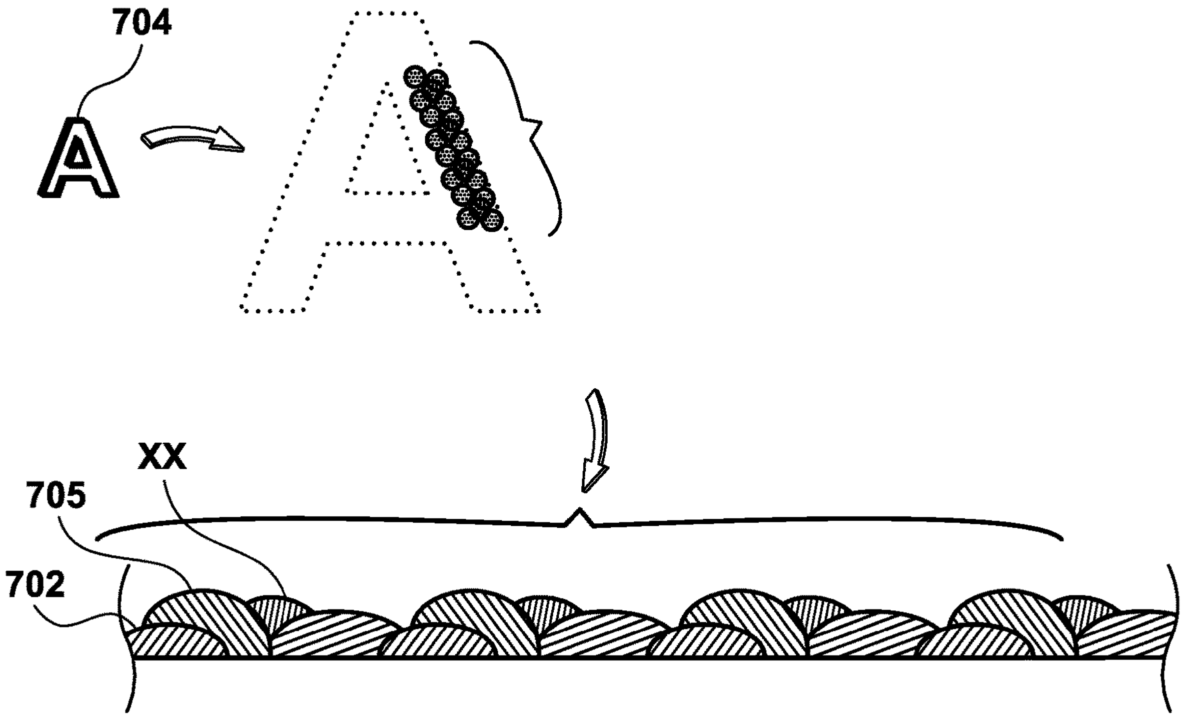
Figure 11B:
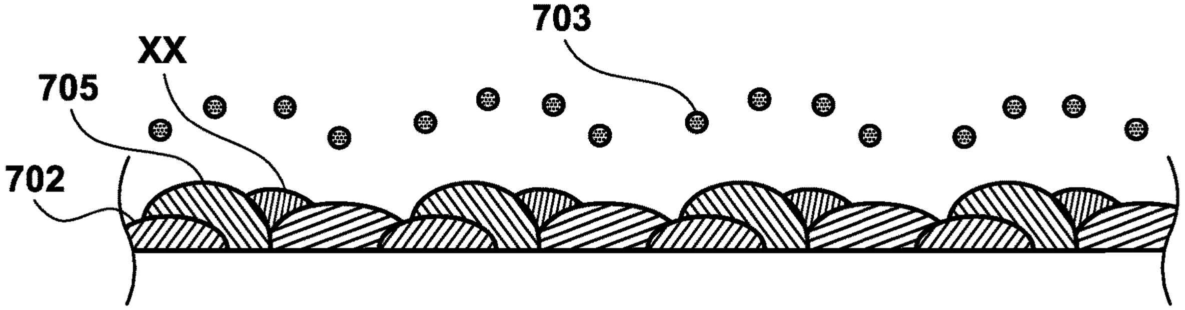

FIGS. 9A, 9B, 10A, 10B, 11A and 11B show the idealization of the iterative printing process. In FIG. 9A, which shows an example of the letter "A" being printed, with a single printing pass, each solid line in the image is actually a solidified and adhered droplet of ink that is separated from other droplets. In FIG. 9B, if a foreign solvent such as ethanol is introduced to the surface, each ink drop is subject to chemical reactions with many foreign solvent molecules, creating a risk of the solid ink droplets being dissolved and displaced from the intended print target, effectively smudging the end result. In FIG. 10A, where a second iterative print has been performed, the second printing pass creates a larger ink droplet and closes the gap between the first ink droplets as shown in FIG. 9A. As such, if a solvent like ethanol is introduced (which is a common scenario to sterilize the tubes in a laboratory medical setting), the likelihood of the ethanol molecules permeating through the ink droplet and dissolving the ink from its intended location is lessened as shown in FIG. 10B. By adding multiple iterative prints and having enough layers as shown in FIG. 11A, each ink droplet is presented with fewer solvent molecules available to dissolve the ink (as shown in FIG. 11B), which creates a higher quality print that is less likely to smudge or disappear.

Figure 12A:
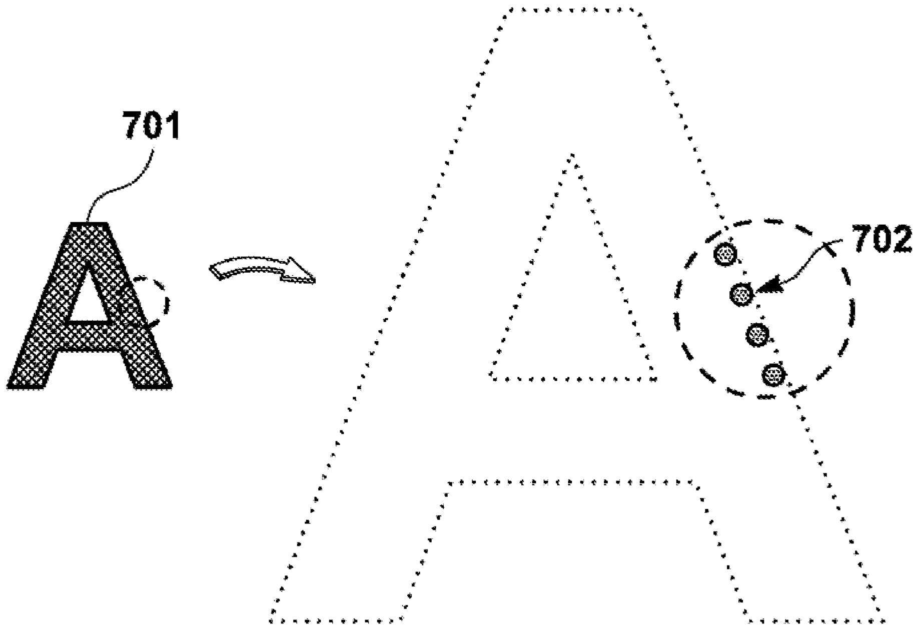
FIG. 12A depicts a diagram of an example letter "A" printed on a curved surface with a close up on ink droplets forming the letter.
Figure 12B:
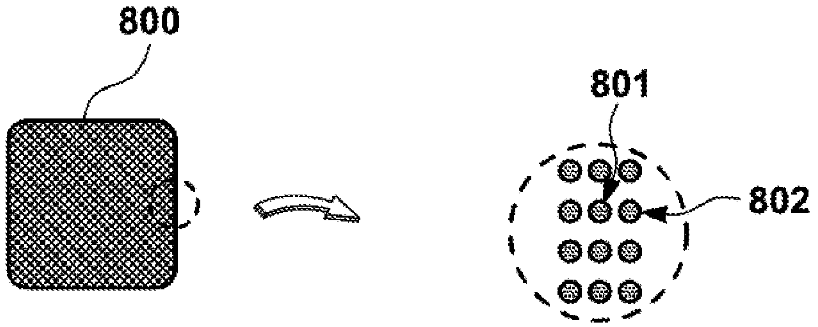
FIG. 12B depicts a diagram illustrating the scoring process by the software to calculate how many iterative prints for a particular dot in the image and/or print object.

FIG. 12 depicts a diagram illustrating one possible implementation of the software algorithm calculating how many iterative prints needed on a particular image (where each iteration could be a different image) based on the software scoring the relative amount of ink dots adjacent to the individual ink dots present in the image in the first print run. Once the first print is completed, the software performs a scan through of the image to map and calculate the number of ink dots present in the first iterative printing of an image. For each ink dot scanned, the software then calculates and assigns a score to said ink dot based on the number of adjacent ink dots relative to said dot in a 3×3 rectangular array 800 with said ink dot in the center of the rectangular array. In one possible iterative print implementation, after the first print cycle is completed, the software scans the printed image or text and maps each ink dot it scanned in a 3×3 rectangular array with the scanned dot 801 being in the middle of said rectangular array, and calculates the number of adjacent dots and assigns a score for that dot ranging between zero to eight based on the number of adjacent dots present. The software then makes a copy of the original image, and modifying said copy by removing ink dots that have a score higher than some desired level. The new image is then sent to the printer, and another print cycle is performed to iteratively print on the surfaces based on the new information and create a higher quality output. This process can be repeated automatically until the desired effect is achieved, or in a decreasing algorithmic iteration, for each time the software finishes an iterative print cycle and conducts a scan, the minimum score for each ink dot is reduced by one.

To further illustrate how the scoring system may be implemented, for example, in FIG. 12, a dot completely surrounded by other adjacent dots 801 in the 3×3 rectangular array may get a score of 8, while a dot occupying the corner of an image 802 may get assigned a smaller score of 3 because there are no other dots beyond the corner of an image (i.e., only being surrounded by 3 dots). An ink dot with no surrounding adjacent dots gets a score of 0.

Another possible embodiment of the iterative printing is the user manually setting how many iterative prints the machine and software should perform. For example, if the user sets three iterative printing, then the machine and software simply runs the print cycle three times.

In another possible embodiment, a formulation of the UV ink without any pigments (i.e., a clear ink formulation) can be used as a clear-coat layer that is applied after the completion of the printing and curing of the first layer, such that there is an additional layer of clear ink that is printed and cured above the first initial layer to further secure the pigments of the cured ink on the intended location and prevent any unintended smearing and therefore increase the overall quality of the printed text and/or image on the cylindrical surface.

Figure 13A:
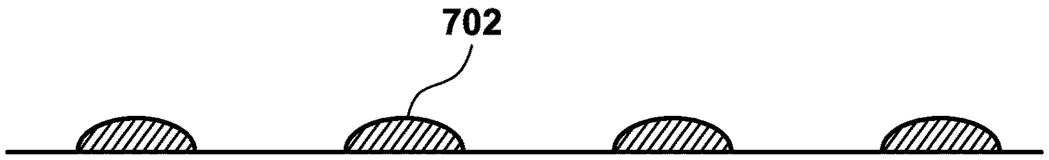
FIGS. 13A, 13B, and 13 C depict diagrams illustrating the UV clearcoat covering process and further illustrate how the protective coating prevents external solvent molecules (or similar chemicals) from reacting with the ink pigments printed and cured on the surface.
Figure 13B:
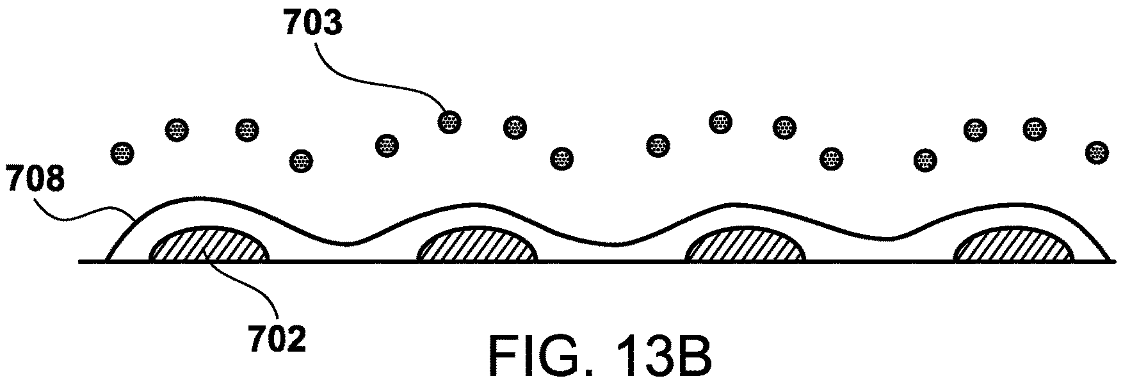
Figure 13C:
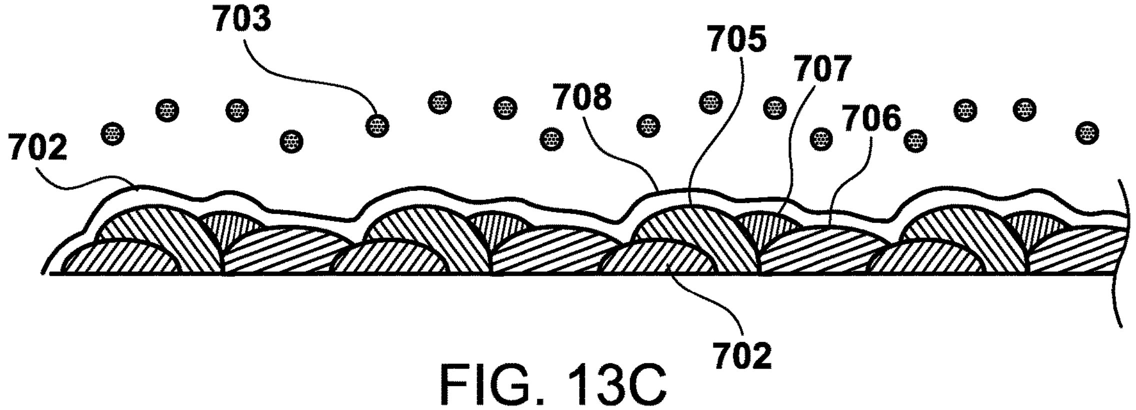

FIG. 13A shows a plurality of ink pigments 702 on a cylindrical surface without any protection whatsoever. While the ink may have been cured, there is still a risk of the ink pigments smearing when said pigments come into contact with solvent molecules 703, which is very common when the cylinder tubes are being sanitized for laboratory medical use. By printing an additional layer of transparent UV-ink on top of the printed image as a clear coat 707, the clear coat 707 protects the ink pigments 702 from the solvent molecules 703 as shown in FIG. 13B. The clear coat 707 can also be applied to the ink pigments as a final step after the iterative printing step, creating further protection, as shown in FIG. 13C.

In another possible embodiment, the clear UV-ink coat can be printed on the surface of the substrate below the ink on the first printing pass, similar to a primer coat on a conventional painting process. The primer coat allows for a better adhesion since the glass or plastic substrate is usually an inert material.

Figure 15A:
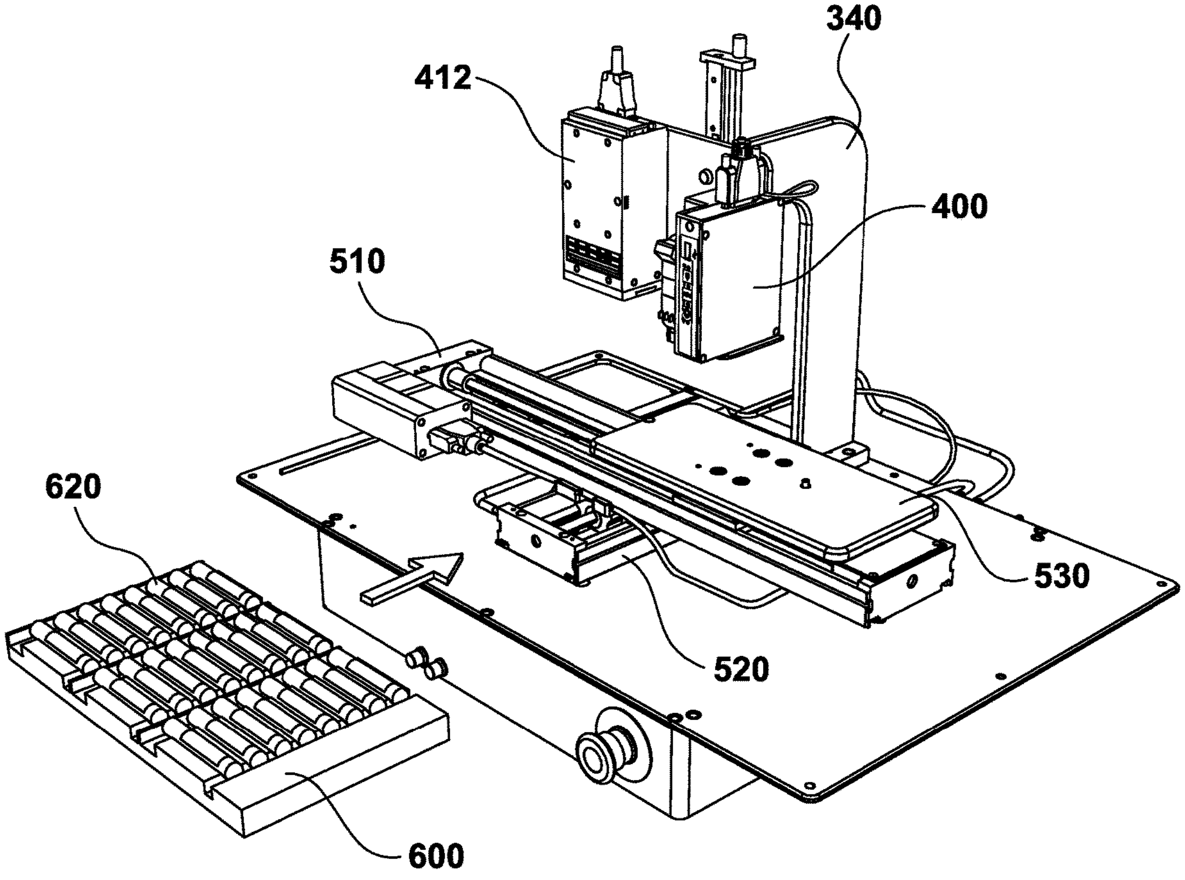
FIGS. 15A, 15B, 15C, 15D, 15E, 15F, 15G, and 15H show the printing sequence from start to finish.
Figure 15B:
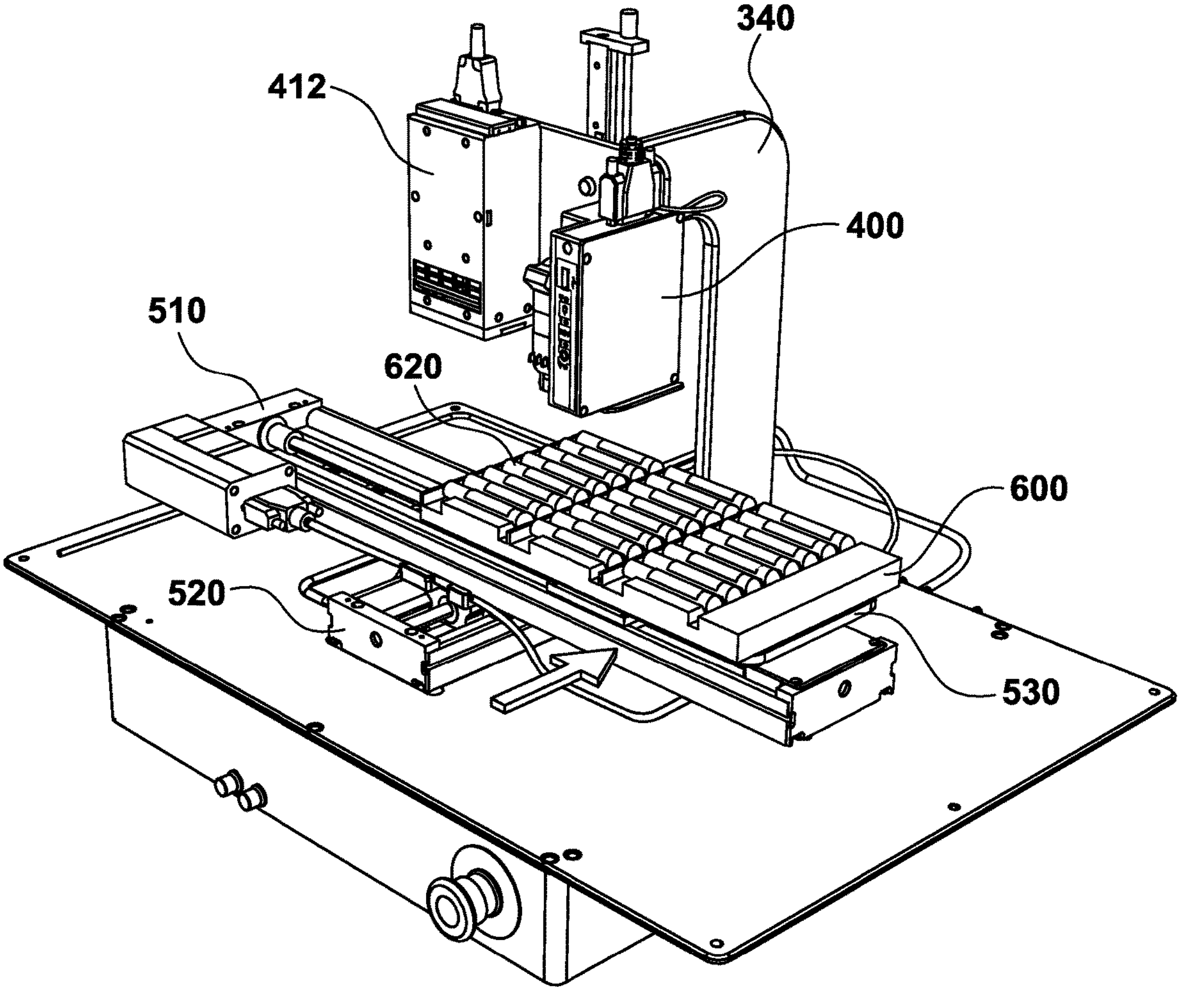
Figure 15C:
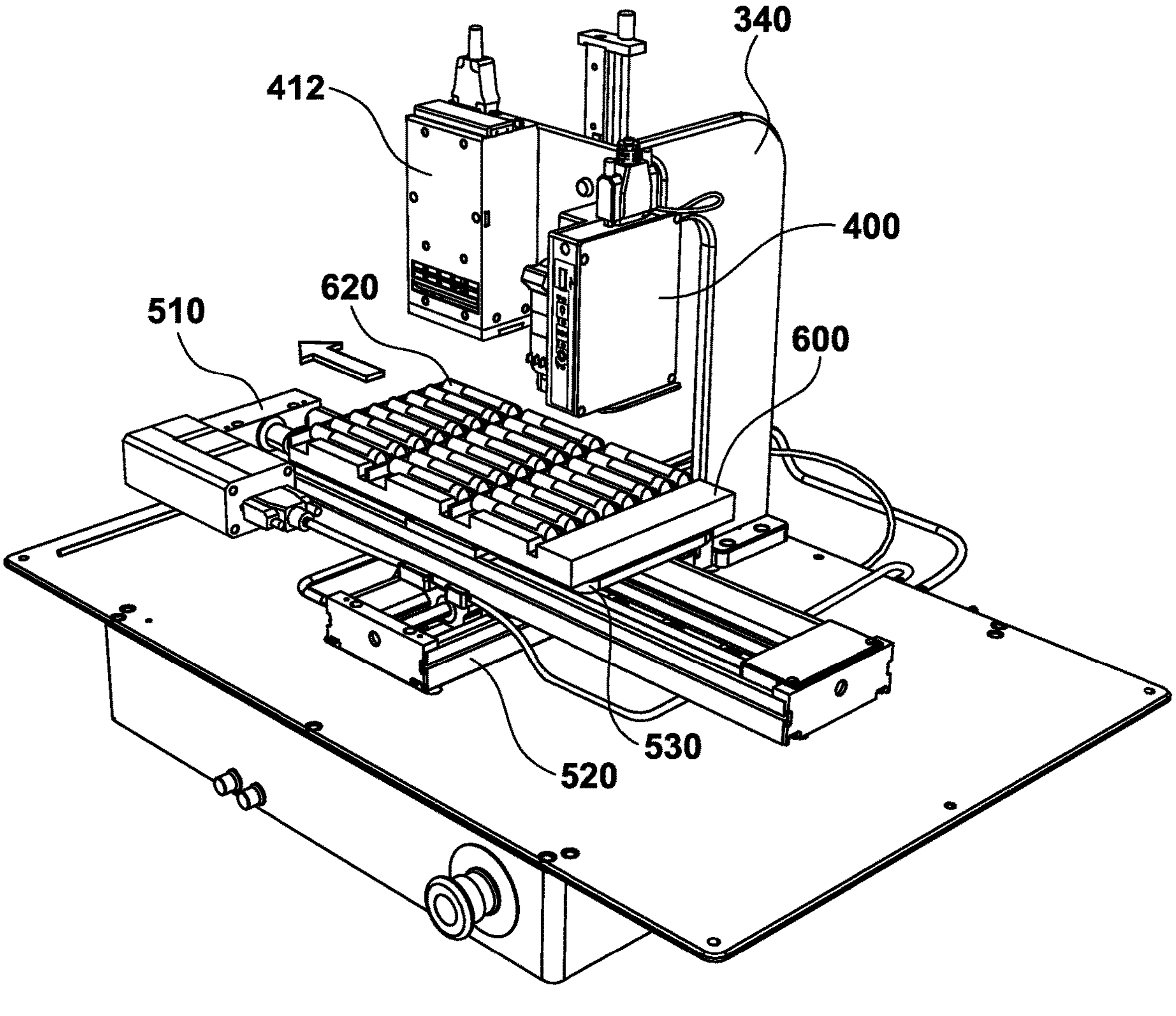
Figure 15D:
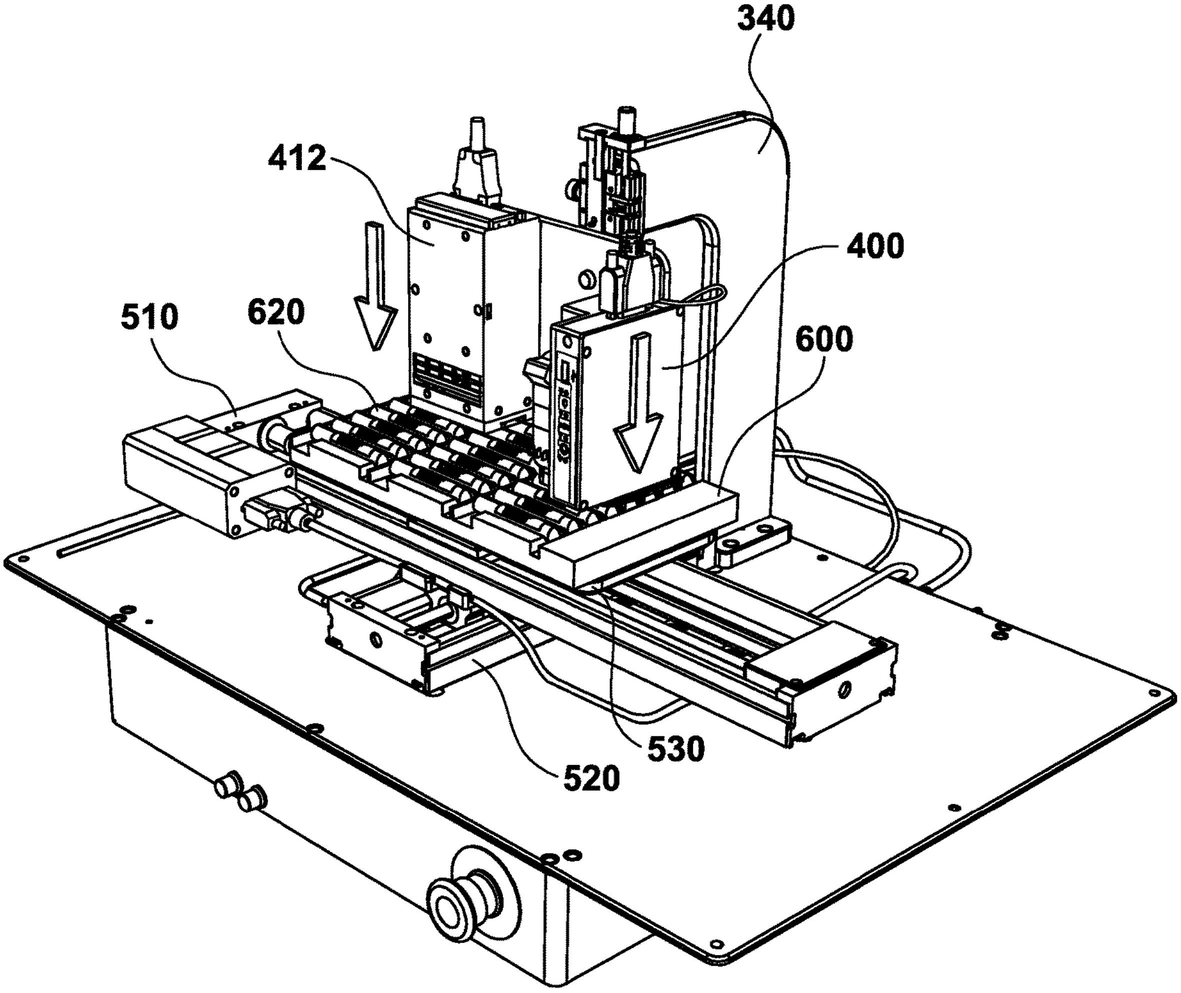
Figure 15E:
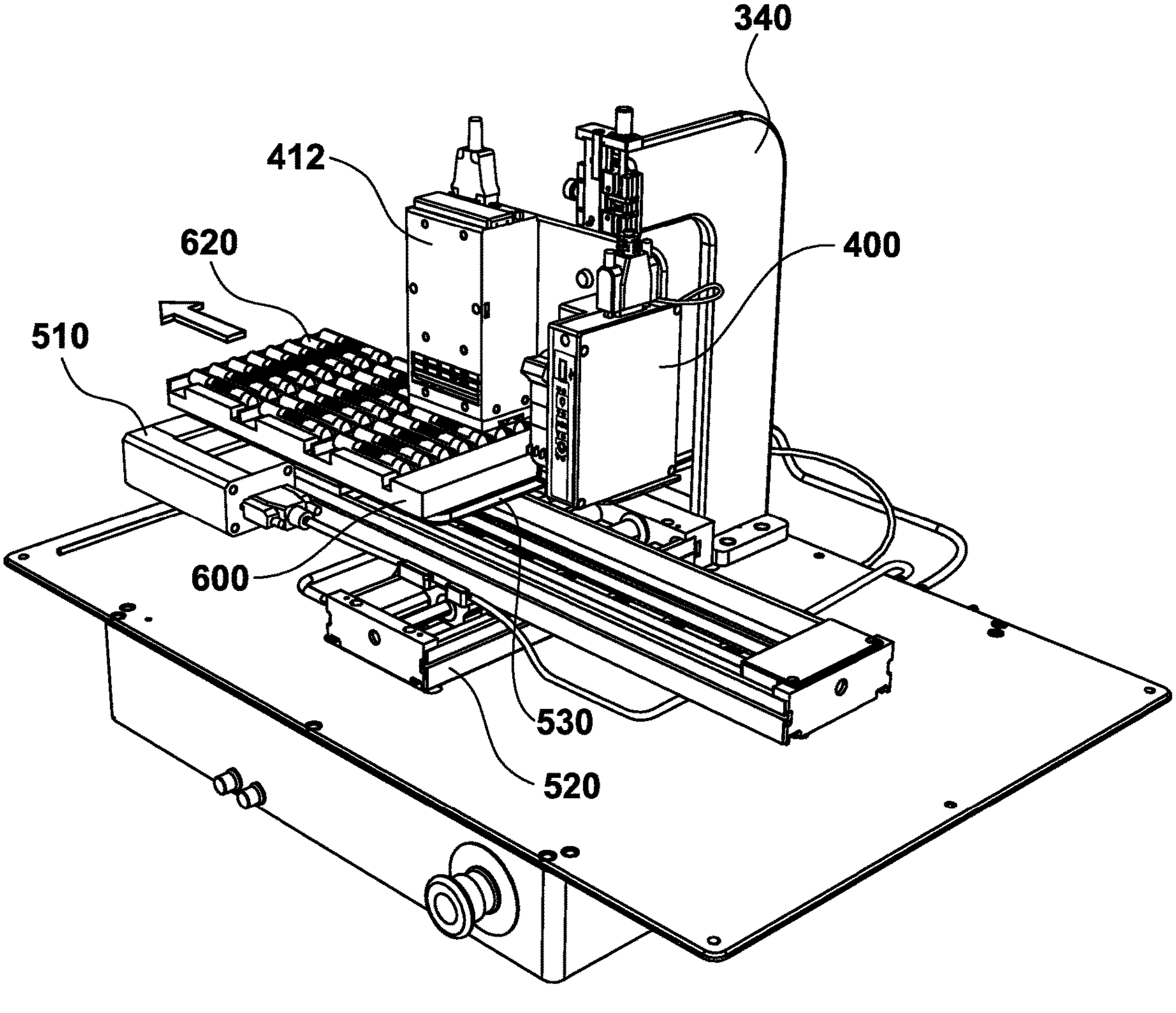
Figure 15F:
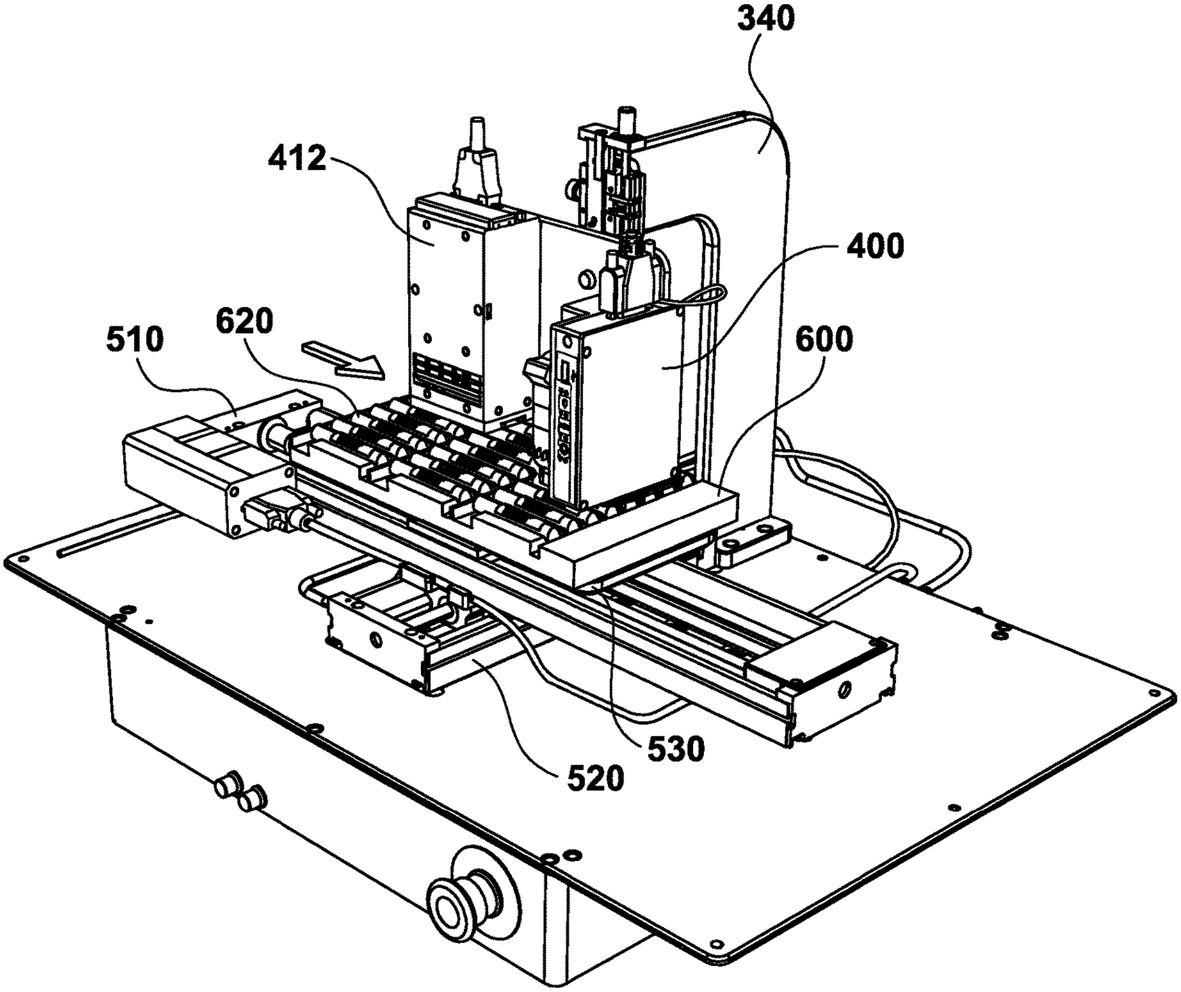
Figure 15G:
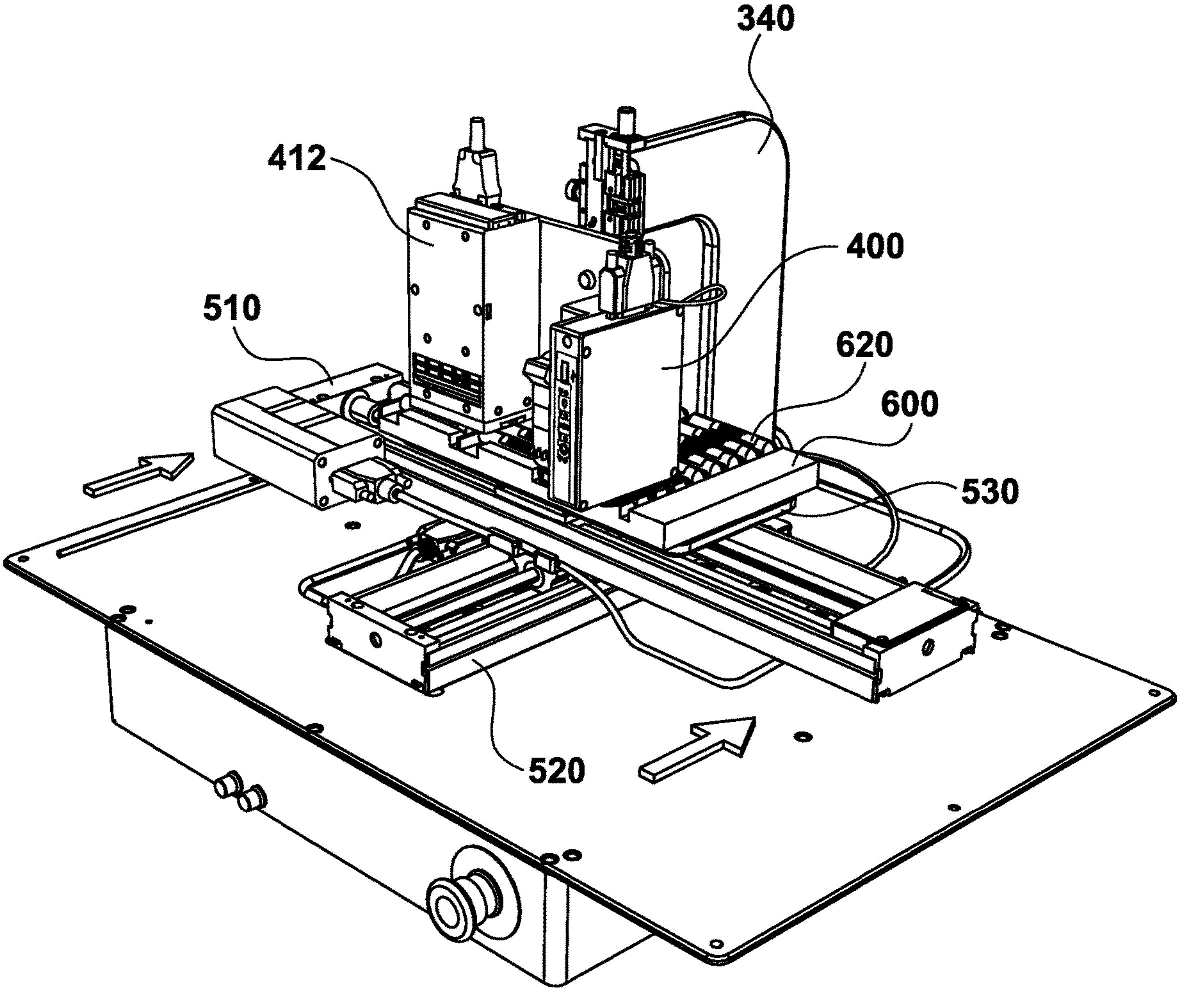
Figure 15H:
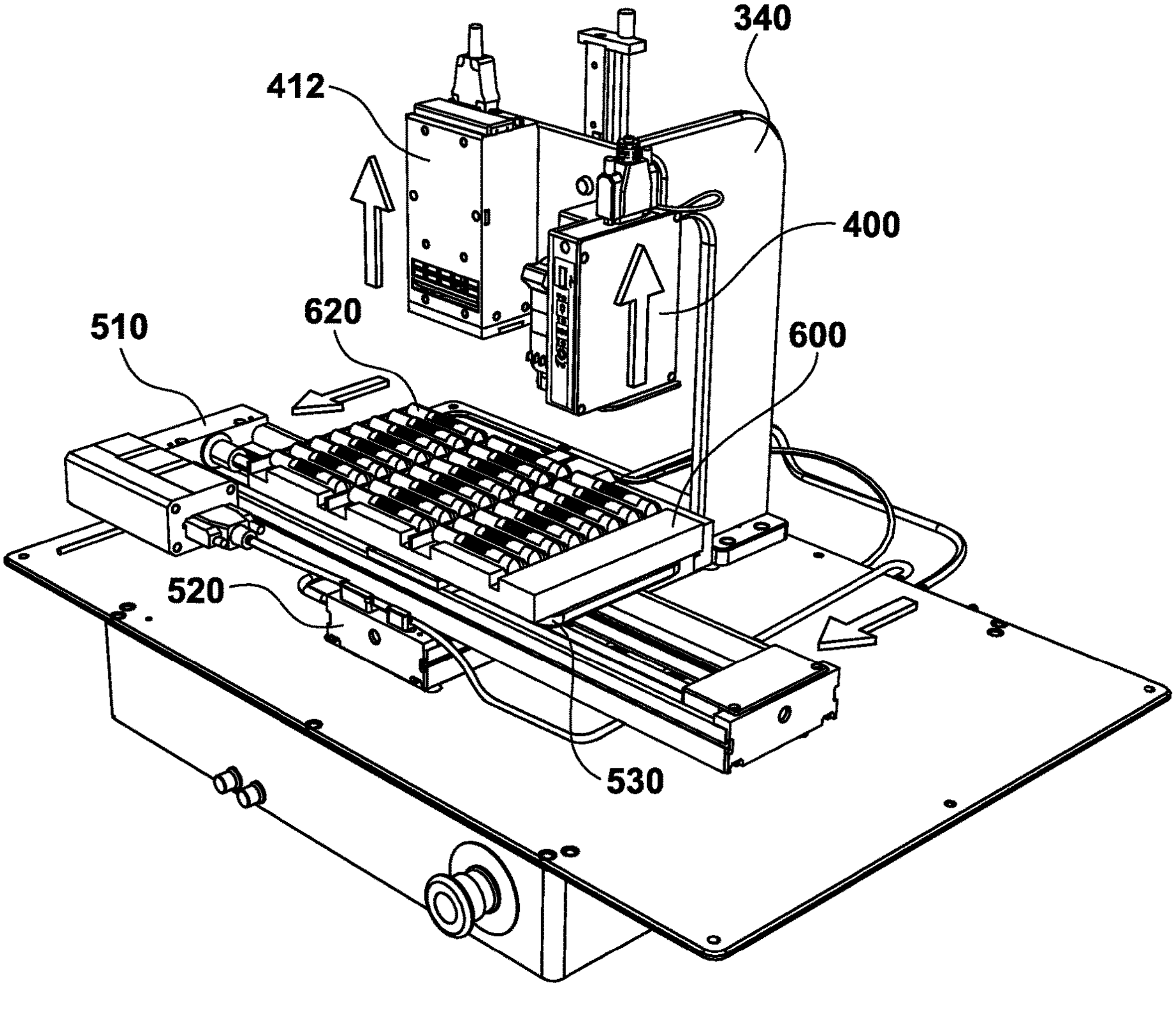

The printing sequence is illustrated in FIGS. 15A-H. A rack containing a plurality of the cylindrical objects is mounted to the platform (FIG. 15A), and the rack is then aligned under the UV unit and printing unit (FIG. 15B). The rack then moved to align the first cylindrical object beneath either the UV unit or the printing unit (FIG. 15C), and once the cylindrical objects are aligned, the UV unit and printing unit moves vertically downward to the printing rack to begin the printing sequence (FIG. 15D). As an optional step, the rack can be moved underneath the UV unit to preheat the surface of the cylindrical objects (FIG. 15E), followed by printing the first row of cylindrical objects (FIG. 15F). Once the first row is completed, the rack moves to the next row, and begins the printing process from the first cylindrical object on the second row (FIG. 15G), and continues the printing process until all of the rows have been printed. Once the printing process is completed, the UV unit and printing unit are raised to their resting position, and the rack is moved away from the UV unit and printing unit towards the opening of the printing device, where a user can retrieve the printed cylindrical objects.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions, and the like. The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams, or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionalities may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A method for iterative printing for an inkjet printing device for cylindrical surfaces, comprising:

a. loading a plurality of cylindrical objects to a printing rack;

b. mounting the printing rack onto a printing platform;

c. engaging in a first printing process, said printing process comprising moving the cylindrical objects underneath a printing unit to print and dispense ink onto the surfaces of the cylindrical objects to create printed images, followed by moving the cylindrical objects underneath a UV-light source unit to cure the ink;

d. scanning the printed images to identify ink dots present on the printed images;

e. assigning a print iteration value for each of the scanned ink dots based on analysis of the scanned ink dots;

f. repeating the printing process described in (c) on the ink dots that are assigned a print iteration value, by a number of repetitions equal to the assigned print iteration value of said ink dots;

g. retrieving the printing rack from the printing platform to allow a person to retrieve the printed cylindrical objects.

2. The method of claim 1, where after mounting the printing rack onto a printing platform described in step (b) and prior to engaging in a first printing process as described in step (c), the cylindrical objects are first moved underneath a UV-light source unit to preheat the surfaces of the cylindrical objects prior to the first printing process.

3. The method of claim 1, where after the final printing process described in step (f) and prior to retrieving the printing rack in step (g), a transparent UV-ink is printed above the outermost printed images, followed by moving the cylindrical objects underneath a UV-light source to cure the ink.

4. The method of claim 1, where the print iteration value for each of the scanned ink dots present on the image is set manually by the user.

5. The method of claim 1, where the print iteration value for each of the scanned ink dots present on the image is calculated by first scanning the printed images for ink dots, and followed by assigning a print iteration value for each scanned ink dots based on the number of adjacent ink dots on a given scanned ink dot.

6. The method of claim 1, where prior to engaging the first printing process in step (c), a coat of a transparent UV-ink is applied to the surface of the cylindrical objects as primer.

* * * * *